(12) United States Patent
Strayer et al.

(10) Patent No.: US 7,069,244 B2
(45) Date of Patent: Jun. 27, 2006

(54) METHOD AND SYSTEM FOR MERCHANT PROCESSING OF PURCHASE CARD TRANSACTIONS WITH EXPANDED CARD TYPE ACCEPTANCE

(75) Inventors: Allen C. Strayer, Omaha, NE (US); Kathleen K. Nimmo, Papillion, NE (US); David G. Weis, Omaha, NE (US)

(73) Assignee: First Data Corporation, Englewood, CO (US)

( * ) Notice: Subject to any disclaimer, the term of this patent is extended or adjusted under 35 U.S.C. 154(b) by 103 days.

(21) Appl. No.: 10/245,784

(22) Filed: Sep. 17, 2002

(65) Prior Publication Data

US 2004/0054622 A1    Mar. 18, 2004

(51) Int. Cl.
   *G06F 17/60*    (2006.01)
(52) U.S. Cl. .............................. 705/39; 705/35; 705/37
(58) Field of Classification Search ............. 705/35–40
   See application file for complete search history.

(56) References Cited

U.S. PATENT DOCUMENTS

| | | |
|---|---|---|
| 4,528,643 A | 7/1985 | Freeny, Jr. |
| 4,700,055 A | 10/1987 | Kashkashian, Jr. |
| 4,884,212 A | 11/1989 | Stutsman |
| 5,146,067 A | 9/1992 | Sloan et al. |
| 5,220,501 A | 6/1993 | Lawlor et al. |
| 5,255,182 A | 10/1993 | Adams |
| 5,352,876 A | 10/1994 | Watanabe et al. |
| 5,440,108 A | 8/1995 | Tran et al. |
| 5,471,669 A | 11/1995 | Lidman |
| 5,477,038 A | 12/1995 | Levine et al. |
| 5,504,808 A | 4/1996 | Hamrick, Jr. |
| 5,511,114 A | 4/1996 | Stimson et al. |
| 5,513,117 A | 4/1996 | Small |
| 5,557,516 A | 9/1996 | Hogan |
| 5,592,400 A | 1/1997 | Sasou et al. |
| 5,637,845 A | 6/1997 | Kolls |
| 5,678,010 A | 10/1997 | Pittenger et al. |
| 5,721,768 A | 2/1998 | Stimson et al. |
| 5,796,832 A | 8/1998 | Kawan |
| 5,868,236 A | 2/1999 | Rademacher |
| 5,903,633 A | 5/1999 | Lorsch |
| 5,936,221 A | 8/1999 | Corder et al. |
| 5,984,181 A | 11/1999 | Kreft |

(Continued)

FOREIGN PATENT DOCUMENTS

WO    WO 02/39368 A1 *  5/2002

OTHER PUBLICATIONS

Messmer, Ellen "MasterCard, Visa try to secure the 'Net", Network World, v12n34, Aug. 21, 1995; pp. 35.*

*Primary Examiner*—Hani M. Kazimi
*Assistant Examiner*—Narayanswamy Subramanian
(74) *Attorney, Agent, or Firm*—Townsend and Townsend and Crew LLP

(57) ABSTRACT

Systems and methods for merchant processing of purchase card transactions with expanded card type acceptance are provided. For each merchant, a record is maintained of each card type that the merchant accepts, and merchant-specific transaction processing parameters are associated with each card type. During transaction processing, a card type for the transaction is identified from transaction data submitted by the merchant, and the merchant-specific transaction processing parameters associated with the identified card type are used to control transaction processing.

25 Claims, 11 Drawing Sheets

U.S. PATENT DOCUMENTS

| | | |
|---|---|---|
| 5,987,438 A | 11/1999 | Nakano et al. |
| 5,991,748 A | 11/1999 | Taskett |
| 6,006,988 A | 12/1999 | Behrmann et al. |
| 6,105,009 A | 8/2000 | Cuervo |
| 6,129,275 A | 10/2000 | Urquhart et al. |
| 6,169,975 B1 | 1/2001 | White et al. |
| 6,193,155 B1 | 2/2001 | Walker et al. |
| 6,295,522 B1 | 9/2001 | Boesch |
| 6,298,336 B1 | 10/2001 | Davis et al. |
| 6,405,182 B1 | 6/2002 | Cuervo |
| 6,473,500 B1 | 10/2002 | Risafi et al. |
| 6,510,983 B1 | 1/2003 | Horowitz et al. |
| 2001/0018660 A1 | 8/2001 | Sehr |
| 2001/0023409 A1 | 9/2001 | Keil |
| 2001/0023415 A1 | 9/2001 | Keil |
| 2001/0047342 A1 | 11/2001 | Cuervo |
| 2002/0174016 A1 | 11/2002 | Cuervo |
| 2003/0053609 A1 | 3/2003 | Risafi et al. |
| 2003/0061157 A1* | 3/2003 | Hirka et al. ................. 705/39 |
| 2003/0167231 A1* | 9/2003 | Winking et al. ............. 705/40 |
| 2003/0212629 A1* | 11/2003 | King ............................ 705/39 |
| 2004/0002918 A1* | 1/2004 | McCarthy et al. ........... 705/40 |

* cited by examiner

Fig. 2

| 202 CARD TYPE IDENT. | 204 PREFIXES | 206 ROUTING INFO. | 208 NAME | 210 SETTLE FLAG | 212 TRANS TYPES | 214 LABEL | 216 OWNER |
|---|---|---|---|---|---|---|---|
| 04001 | Assn V table | | Assn V: US | Y | SRCP | 04 | |
| 04002 | Assn V table | | Assn V: Canada | Y | SRCP | 04 | |
| 01001 | Assn M table | | Assn M | Y | SR | 01 | |
| 05001 | 350000-399999 | | Assn A | N | SRCP | 05 | |
| 02123 | Assn B table | | Assn B | N | SRCP | 02 | |
| 06987 | 6000-6999 | | Assn C | N | SRCP | 06 | |
| 03003 | Assn J table | | Assn J | Y | SRCP | 03 | |
| 07001 | 2000 | | OilCo | Y | SRP | 07 | |
| 09234 | 912345 | | Retailer H | Y | SRP | 09 | Client 1 |
| 09777 | 967890 | | Retailer P | N | SRCP | 09 | Client 2 |
| 09003 | 395000-39999 | | Retailer D | Y | SRP | 09 | |
| 13222 | n/a | | Debit Net R | | SRC | 13 | |
| 14444 | n/a | | Debit Net S | | SRC | 13 | |

| 402 | | | | | | |
|---|---|---|---|---|---|---|
| CARD TYPE IDENT. | 404 PREFIXES | 406 AUTHS FLAG | 408 TICKETS FLAG | 410 REIMB. FLAG | 412 ACH FLAG | 414 TRANS TYPES |
| 04001 | Assn V table | Y | Y | Y | Y | SR |
| 01001 | Assn M table | Y | Y | Y | Y | SRC |
| 05005 | 350000-399999 | N | Y | N | N | SR |
| 09234 | 912345 | N | Y | Y | Y | SRP |
| 13222 | n/a | Y | Y | Y | Y | SRC |

METHOD AND SYSTEM FOR MERCHANT PROCESSING OF PURCHASE CARD TRANSACTIONS WITH EXPANDED CARD TYPE ACCEPTANCE

BACKGROUND OF THE INVENTION

The invention relates generally to merchant processing of purchase card transactions. In particular, the invention relates to systems and methods for processing a variety of purchase card products and transaction types that may be presented to a merchant.

Purchasing of goods and services using a purchase card (e.g., credit card or debit card) for payment has become commonplace. Card issuers, such as banks, retailers, or other financial service providers, provide cardholders with purchase card accounts. The card issuer agrees to transfer funds to various merchants—either directly or via an intermediary—in payment for goods and services received by the cardholder, and the cardholder agrees either to repay the card issuer or to have funds deducted from the cardholder's deposit account. The cardholder receives a presentation instrument, which is typically a rectangular piece of plastic bearing a card number and other identifying information. To purchase goods or services, the cardholder either presents the presentation instrument or provides the card number to a merchant. The merchant accepts the presentation instrument and delivers the goods or services to the customer, generating a transaction record (ticket) in paper or electronic form. In order for the merchant to be paid and the cardholder to be billed, the merchant typically submits the ticket to an acquiring bank for processing.

Acquirer processing (also called merchant processing) of purchase card transactions is complicated by a number of factors. For instance, how a purchase card transaction is processed depends on the particular card product used. For example, some card products (e.g., VISA and MASTERCARD products) are "interchange" cards, which are issued by various banks or other institutions under the authority of a card association that establishes rules regarding the use and acceptance of the card products. Each card association typically provides an interchange service for routing transactions between an acquiring bank and a card issuing bank. An interchange card generally may be accepted by any merchant, as long as the merchant maintains an account with an acquiring bank (or other institution) that participates in the card association. Authorization and settlement requests for interchange cards are generally processed by routing the requests from the acquiring bank to the card association, which then routes the requests to the card issuing bank. Other card products may be "private label" products, for which routing of requests between banks is not supported. For such cards, it is generally necessary the acquiring bank also be the card issuing bank, making the acceptance of such cards limited. Examples include credit cards issued by retailers, which are usually accepted only at the retailer's own outlets.

Transaction processing is further complicated by the variety of card products that a single card association or issuer may offer. For instance, a large card association (e.g., the VISA or MASTERCARD association) typically offers a range of card products such as credit cards (where the cardholder is billed for purchases), check cards (where purchase amounts are deducted directly from the cardholder's checking account), corporate cards (where an employer of the cardholder receives the bill), and so on. Each card product may be subject to different rules and regulations regarding the use, acceptance, and processing of the card product.

Still more complexity arises due to card issuers' participation in electronic debit networks such as the NYCE or PLUS networks. These debit networks typically do not issue card products themselves. Instead, they agree with various banks to provide network services for routing debit card transactions from an acquiring bank to a card issuing bank. An issuing bank may participate in multiple electronic debit networks; cards issued by the bank generally bear a badge for each debit network in which the bank participates. Thus, depending on where and how it is presented, the same plastic could be used, e.g., for a credit card transaction to be routed through the VISA interchange or a debit card transaction to be routed through the NYCE network or the PLUS network. An acquiring bank must be able to distinguish these uses and properly route each transaction.

Yet another layer of complexity is added by the possibility that the cardholder may present the same card to a merchant for different types of transactions. For instance, in addition to sales transactions, the cardholder may desire to return goods previously purchased using the card, obtain a cash advance using the card, or make a payment on the outstanding balance of the card account. Each card association or issuer has rules related to whether a merchant may accept a particular card product for each type of transaction. For instance, a retail outlet may be authorized to accept an interchange card for sales but not for cash advances; the same retail outlet may be authorized to accept both sales and cash transactions using a debit network.

To accommodate customer preferences, many merchants desire to offer a variety of options to their customers, including the ability to use a number of different card products from different issuers, associations, and networks, as well as the ability to perform different types of transactions for a particular card product. At the same time, merchants also desire to control expenses associated with accepting different card products, for instance, by not having to maintain accounts with a number of different acquiring banks. Thus, in order to provide effective card processing services to a merchant, an acquiring bank must be prepared to process a variety of card products and transaction types, routing each transaction to the correct destination, deducting appropriate fees, and keeping accurate records of activity.

To assist acquiring banks, third-party merchant services providers offer transaction processing services to a number of such banks. In addition to managing the processing and recording of card transactions, such a third-party provider must also manage information regarding which card products and transaction types a particular one of its acquiring bank clients is allowed to accept, in addition to information about each merchant.

An acquiring bank or a third-party service provider generally operates one or more platforms for processing purchase card transactions. Each platform includes various data stores, such as merchant records that provide information about each merchant account; the record for a particular merchant may be identified by a unique merchant identification number. The platform receives a batch of transaction tickets from the merchant, transfers corresponding funds to the merchant's account, routes tickets to the appropriate entities for settlement, and keeps records of the merchant's activity for accounting and reporting purposes.

Existing systems are limited in their ability to process a merchant's transactions involving a variety of card products and transaction types. For example, in some existing systems, a private label card is implemented using a processing platform that has both the cardholder account records and the merchant account records, thereby eliminating the need to route the transactions to another system for settlement. However, such platforms may be unable to handle processing of interchange card transactions, for which different formatting and routing procedures are required. Thus, a separate platform is usually provided for interchange cards. Consequently, a merchant who accepts both a private label card and an interchange card must have a record on two different platforms, generally with a different identification number on each platform. Either the merchant must submit transactions separately (i.e., in separate batches) for the two card products or the transactions must be rebatched prior to processing. In either case, there is generally no link between the merchant records on the two processing platforms: the merchant receives reports separately for each card, and any changes to the merchant data (e.g., the merchant's address) must be made separately on each system. Similar problems may arise in regard to other combinations of card products having conflicting processing rules. In some instances, the overhead associated with handling additional card products causes acquiring banks or third-party providers to limit the merchant's options for accepting various cards.

Existing systems also limit the ability of a merchant to accept different transaction types. For instance, many existing systems limit a merchant record to one or two transaction types per card product (e.g., sales and returns only, or cash advances and payments only). Thus, if a merchant desires to accept both sales and cash advance transactions for a particular card product, two records would have to be maintained for the merchant. Either the merchant is required to submit separate batches for each transaction type or the transactions are rebatched prior to processing. Again, this leads to inefficiency and overhead that may cause acquiring banks or third party providers to limit the merchant's options for allowing customers to perform different transactions.

Further, existing systems also limit the acquiring bank's ability to assess fees that reflect the bank's actual costs. For example, when an acquiring bank acquires a ticket, it generally pays to the merchant account an amount less than the face value of the ticket by a percentage known as the discount rate. The discount rate reflects the risk that the acquiring bank will not be repaid by the card issuer; in the case of interchange cards, it also reflects the interchange fee (set by the card association) that the acquiring bank will have to pay in settlement of the transaction. The risk and the interchange fee may vary depending on the card product used. For instance, a card association may set an interchange fee of 2% of the transaction total for transactions using its credit card products and 3% of the transaction total for transactions using its debit card products. Such fees may vary from one association, issuer, or network to another. However, existing systems typically do not enable the acquiring bank to determine the discount rate on a transaction-by-transaction basis. In some systems, the merchant record is associated with one discount rate so that applying different discount rates for different transactions would again require maintaining multiple records for the same merchant. Further, existing systems for processing ticket acquisition often do not support determining the particular card product that was used.

Hence, it would be desirable to manage merchant accounts in a manner that provides increased flexibility for acquiring banks to process different card products and different transaction types, and to price transactions according to the card product used.

BRIEF SUMMARY OF THE INVENTION

Embodiments of the present invention provide systems and methods for merchant processing of purchase card transactions with expanded card type acceptance, enabling processing of merchant transactions involving a number of card products for various transaction types without the need to maintain multiple records for a merchant. For each merchant, a record is maintained of each card type, and transaction processing parameters are associated with each card type. A "card type" may be defined to correspond to a single card product, a group of card products, or only certain cards of a particular card product. During transaction processing, a card type for the transaction is identified from transaction data submitted by the merchant, and the transaction processing parameters associated with the identified card type are used to control transaction processing. Because the processing parameters can be specific to a particular merchant and a particular card type, a single platform can support any merchant accepting any card type or combination of card types, including interchange cards and private label cards issued by the merchant or by other merchants. In addition, the same card can be subjected to different processing rules depending on where it is presented.

According to one aspect of the invention, a method for processing a purchase card transaction submitted by a merchant is provided. A purchase card identifier is extracted from transaction data submitted by the merchant. A card type corresponding to the purchase card identifier is identified from a list of card types accepted by the merchant, the list of card types corresponding to a plurality of card products including an interchange card and a private-label card. The purchase card transaction is processed according to merchant-specific rules determined from merchant-specific processing parameters associated with the identified card type. The merchant-specific processing parameters may be used to determine, e.g., whether the merchant is allowed to submit transactions of the submitted type, where to route the transaction data for settlement, how to format the transaction data, whether the acquirer reimburses the merchant, what discount rate to apply, and so on. The list of card types accepted by the merchant may include at least one private label card issued for a retailer, where the merchant is not an outlet of the retailer.

According to another aspect of the invention, a method of processing purchase card transactions is provided. A plurality of card types is defined, at least one of the plurality of card types corresponding to a purchase card and having associated therewith a plurality of merchant-specific sets of transaction processing parameters. Each of a plurality of merchants is authorized to accept one or more of the plurality of card types. Upon a cardholder presenting to a merchant the purchase card corresponding to the at least one card type having associated therewith the plurality of merchant-specific sets of transaction processing parameters for a transaction, the transaction is processed using one of the plurality of merchant-specific sets of transaction processing parameters that corresponds to the merchant. A first one of the plurality of merchant-specific sets of transaction processing parameters may include a first routing destination parameter, and a second one of the merchant-specific sets of transaction processing parameters may include a second routing destination parameter different from the first routing destination parameter. The purchase card may bear a first badge identifying a first card issuing entity and a second badge identifying a second card issuing entity. In this case, the first routing destination parameter can correspond to a routing destination for a card product of the first card issuing entity while the second routing destination parameter corresponds to a routing destination for a card product of the second card issuing entity.

According to another aspect of the invention, a method for processing purchase card transactions submitted by a plurality of merchants is provided. A plurality of card types is defined, each card type corresponding to a group of purchase cards and having associated therewith a set of merchant-independent transaction processing parameters. For each of the plurality of merchants, a merchant card type list is created. Each merchant card type list includes a subset of the plurality of card types, and a set of merchant-specific transaction processing parameters is associated with each card type in the subset. For each purchase card transaction, a card type corresponding to the purchase card used in the purchase card transaction is identified from the merchant card type list for the merchant submitting the purchase card transaction. The merchant-specific transaction processing parameters and the merchant-independent transaction processing parameters associated with the identified card type are used to control processing of the purchase card transaction. The plurality of card types may include a private label card type corresponding to a private label card of an issuing retailer, and a first merchant card type list for a first merchant that is not an outlet of the issuing retailer can include this private label card type. A second merchant card type list for a second merchant that is an outlet of the issuing retailer can also include this private label card type. Merchant card type lists may be created from default card type lists, and additional card types can be added to the default card types on a merchant-by-merchant basis.

According to another aspect of the invention, a method for processing purchase card transactions submitted by a plurality of merchants, each of which is associated with one of a plurality of acquirers, is provided. A master card product list is defined to include a plurality of card types, each card type corresponding to a group of purchase cards and having associated therewith a set of merchant-independent transaction processing parameter values for the group of purchase cards. For each acquirer, an acquirer-level card product list is defined, each acquirer-level card product list including a subset of the plurality of card types. Each merchant is associated with at least one of the card types included in the acquirer-level card product list of the associated acquirer, and for each card type associated with the merchant, values are established for a set of merchant-specific transaction processing parameters. For each purchase card transaction submitted by one of the plurality of merchants, a card type for the purchase card used in the purchase card transaction is identified from the at least one card type associated with the merchant. The merchant-specific transaction processing parameter values and the merchant-independent transaction processing parameter values associated with the identified card type are then used to control processing of the purchase card transaction.

According to another aspect of the invention, a system for processing a purchase card transaction submitted by a merchant is provided. The system includes: an interface configured to receive transaction data for the purchase card transaction; control logic configured to identify a card type for the purchase card transaction from a list of card types accepted by the merchant using the received transaction data, the list of card types corresponding to a plurality of card products including an interchange card and a private label card; and control logic configured to process the purchase card transaction according to one or more merchant-specific rules associated with the identified card type.

According to another aspect of the invention, a system for processing purchase card transactions for a plurality of merchants is provided. The system includes: an interface configured to receive transaction data to be processed; a server configured to perform a transaction processing operation using the transaction data; a card product data store containing a master card product list, the master card product list defining a plurality of card types and associated merchant-independent processing parameters; and a merchant master data store containing a merchant card type list for each of the plurality of merchants, each merchant card type list including at least one of the plurality of card types and associated merchant-specific processing parameters. The server is further configured to use a merchant card type list for a merchant to identify a card type for a purchase card transaction submitted by the merchant and to use the merchant-independent and merchant-specific processing parameters associated with the identified card type to control the transaction processing operation.

According to another aspect of the present invention, a system for processing purchase card transactions submitted by a plurality of merchants, wherein each of the merchants is associated with one of a plurality of acquirers is provided. The system includes a data store having: (1) a master card product list including a plurality of card types, each card type corresponding to a group of purchase cards and having associated therewith one or more merchant-independent transaction processing parameters; (2) a plurality of acquirer-level card product lists, each acquirer-level card product list including a respective subset of the plurality of card types; and (3) a plurality of merchant card product lists corresponding to the plurality of merchants, each merchant card product list including at least one of the card types included in the acquirer-level card product list of the associated acquirer, each card type in each merchant-card product list further having associated therewith one or more merchant-specific transaction processing parameters. The system also includes control logic configured to identify a card type for a purchase card used in a purchase card transaction submitted by a merchant, the card type being identified from a merchant card product list corresponding to the merchant submitting the purchase card transaction; and control logic configured to process the purchase card transaction using the one or more merchant-independent transaction processing parameters and the one or more merchant-specific transaction processing parameters associated with the identified card type.

The following detailed description together with the accompanying drawings will provide a better understanding of the nature and advantages of the present invention.

BRIEF DESCRIPTION OF THE DRAWINGS

FIG. 2 is a table representing contents of a master card product list according to an embodiment of the present invention;

DETAILED DESCRIPTION OF THE INVENTION

Embodiments of the present invention provide improved systems and methods for merchant processing that enable merchants to accept a variety of card products for various transaction types. According to one embodiment of the present invention, a transaction processor (e.g., an acquiring bank or a third-party provider of merchant processing services) maintains a record that identifies each card type and the associated transaction types that a particular merchant is authorized to accept. As will be apparent from the present disclosure, a "card type" may correspond to a single card product, a group of card products, or only certain cards of a particular card product. A process for authorizing a transaction includes determining whether the merchant is authorized to accept the card product presented for the transaction type selected. During ticket acquisition and settlement, an identifier of the card type is used to control the acquirer-side processing of the ticket.

Figure 1:
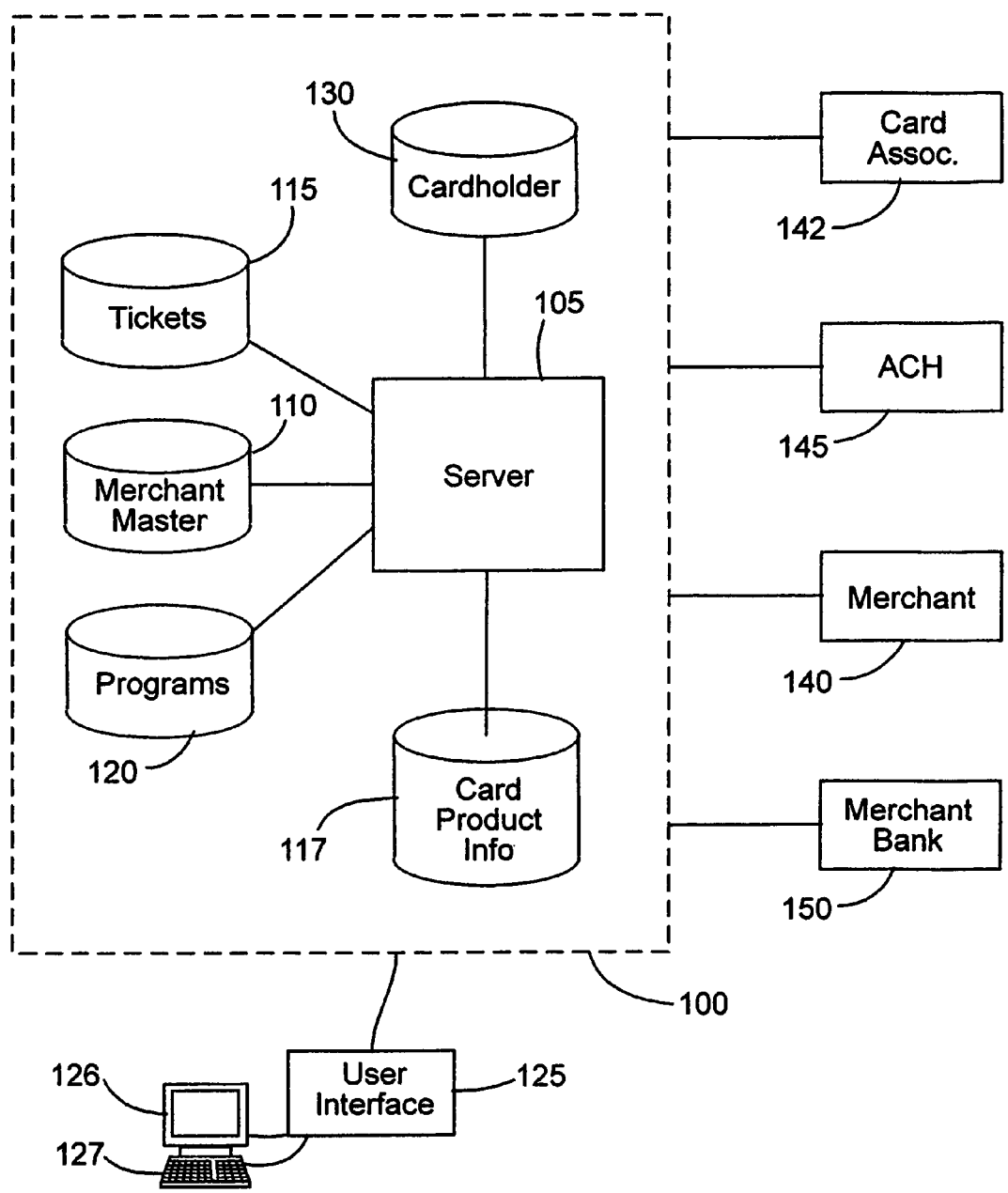
FIG. 1 is a simplified block diagram of a merchant processing platform according to an embodiment of the present invention.

FIG. 1 is a simplified block diagram of a merchant processing platform 100 according to one embodiment of the present invention. Merchant processing platform 100 operates to provide merchant processing services for one or more acquirers, which may be banks or other financial services institutions. In one exemplary embodiment, merchant processing platform 100 is under the control of an acquirer; in another exemplary embodiment, merchant processing platform 100 is under the control of a third-party provider and is used to provide merchant processing services for one or more acquirers that are clients of the third-party provider.

Merchant processing platform 100 includes a server 105, which may include a single computer or any number of networked computers. In general, server 105 manages updating of merchant information, processing of individual transactions, and reporting of merchant account activity, as will be described further below. Various operations of server 105 may be automated; for instance, settlement of a batch of tickets may be automatically initiated on a daily basis. It will be appreciated by persons of ordinary skill in the art that where server 105 is implemented using multiple computers, the various functions of server 105 may be assigned to various ones of the computers in any suitable manner.

Server 105 accesses various data stores including a merchant master data store 110, a ticket data store 115, and a card product data store 117. Merchant master data store 110 provides storage of merchant-specific information needed to process transactions for a particular merchant, including information regarding the card types accepted by the merchant, as will be described further below. Ticket data store 115 contains information regarding individual purchase card transactions (including, e.g., authorization and ticket transactions) for use during processing. Card product data store 117 provides storage of information related to card products for which transactions may be processed using platform 100. Each data store may include any suitable data structures, such as databases and/or data files (e.g., Virtual Storage Access Method ("VSAM") files). The data structures may be stored on any suitable computer-readable storage media, including optical or magnetic storage media. In addition, the data stores may be on separate storage devices or the same storage device.

In the embodiment shown, server 105 also accesses a program library 120 that houses executable instructions for performing various merchant processing functions. Server 105 may be configured to execute various programs from library 120 automatically (e.g., on a periodic basis) or in response to user commands received via a user interface 125. In embodiments where platform 100 is configured to process private label purchase card transactions, platform 100 may also include a cardholder data store 130.

User interface 125 enables authorized personnel (generally, persons affiliated with the acquirer or third-party provider) to perform functions including updating data in merchant master data store 110 and card product data store 117. User interface 125 may include hardware or software security components (e.g., password authentication) to prevent unauthorized use. In the embodiment shown, user interface 125 interacts with a display device for presenting information to a user, e.g., a computer monitor 126, and a user input device for accepting input from a user, e.g., a keyboard 127. A user may access user interface 125 directly or via a network connection such as a local area network, leased line, virtual private network, intranet or internet.

Platform 100 communicates with various external components to perform merchant processing functions. In the embodiment shown, platform 100 communicates with one or more merchants 140; one or more card associations 142; and an electronic transaction clearinghouse 145, e.g., the Federal Reserve Automated Clearinghouse (ACH) system. In some embodiments, platform 100 may also communicate with one or more acquirers 150. Communication between platform 100 and the various external components may take place over a variety of networks, including leased lines, telephone lines, virtual private networks, or the Internet. Communication may also take place by the exchange of computer-readable media, such as data tapes, recordable compact disks, and the like. Some communication may also be in paper form. Hardware and/or software-based security components (not shown) such as firewalls and data encryption systems may also be provided.

It will be appreciated that the description of platform 100 is illustrative and that platform 100 and its associated functionality may also be implemented using more or fewer components than those described herein. Based on the disclosure and teachings provided herein, a person of ordinary skill in the art will recognize other ways and/or methods for implementing the present invention.

In one embodiment of the present invention, platform 100 is operated by a third-party provider of merchant processing services and configured to process all purchase card transactions submitted by a particular merchant. That is, platform 100 may process any transaction involving any card product accepted by the particular merchant. In order to perform this function, platform 100 includes card product data store 117, which stores a repository of information about card products that may be presented. The repository includes a master card product list, which will now be described.

FIG. 2 illustrates the contents of an exemplary master card product list 200. Each entry in master card product list 200 defines a card type that platform 100 is capable of processing; master card product list 200 preferably includes an entry for every card type that the third party provider recognizes. As will be apparent from the present disclosure, a "card type" entry in master card product list 200 provides a definition of how platform 100 can process a transaction when a particular card is presented. A card type may be defined for any arbitrary grouping of cards, such as a card product, a group of card products that are processed in the same way, or a subset of the cards associated with a particular card product. In addition, the same card product may be associated with more than one card type; examples will be described below. To manage the various options for transaction processing, master card product list 200 provides a number of fields of information related to each card type.

For instance, card type identifier 202 is a code that uniquely identifies each entry in master card product list 200. In one embodiment, card type identifier 202 is a five-digit numerical code; alphanumeric codes of arbitrary length may also be used. Card type identifier 202 may be assigned arbitrarily or according to any desired scheme.

Prefix field 204 contains information for use in determining the card type of a presentation instrument presented to a merchant. In one embodiment, prefix field 204 contains one or more card prefixes associated with a particular card product or group of card products; the card prefix corresponds to the first few digits of the account identification number of a presentation instrument. As is known in the art, when card associations or issuers assign numbers to cardholder accounts, the first few digits of the number are generally used to identify the card product. For instance, assuming that card products belonging to a card association C always have numbers beginning with a four-digit sequence in the range from "6000" to "6999," this four-digit sequence would be the card prefix for an association C card product. (The number of digits constituting the prefix may vary from one card association to the next.) An industry standards organization (ISO) assigns blocks of prefixes to a card issuer or association at the issuer's or association's request. Thus, in some embodiments of the present invention, the card prefix is sufficient to uniquely identify the issuer (and/or association) of the card and the card product. In other embodiments, prefix block 204 may be supplemented or replaced with any other information obtainable from a merchant that can be used to determine the card type of a presentation instrument.

In some cases, prefix block 204 may provide a reference to another source of prefix information. For instance, some card associations (e.g., the VISA and MASTERCARD associations) provide prefix tables that are updated periodically; these tables identify all valid prefixes associated with each card product authorized by the association. Master card product list 200 may either list such prefixes or refer to the association-provided prefix table.

Routing field 206 includes a destination to which transactions for a particular card type are to be routed. Routing field 206 may also identify a format to be used for transaction routing. In one embodiment, routing field 206 provides four items of information: authorization format, authorization destination, routing format, and routing destination. This information may be provided using predefined codes that map to each available routing destination and format option. The use of routing field 206 will be described below.

Name 208 is a human-readable identifier associated with card type identifier 202. Generally, name 208 reflects the name of a card issuer, association, or network responsible for the card product(s). Multiple card types may have the same name; however, to facilitate user interaction with master card product list 200, it is advantageous for each name 208 to include some piece of unique information. In some embodiments, name 208 is provided as a convenience to users and has no effect on transaction processing.

Settlement flag 210 indicates whether the third-party provider performs settlement (value "Y") or not (value "N") for this card type. This flag is used during processing to determine whether a transfer of funds from the acquirer to the merchant should be initiated, as will be described below.

Transaction types field 212 contains one or more indicators of types of transactions that the third-party provider supports for the card type. In one embodiment, the available transaction type indicators refer to the standard transaction types recognized in the art, namely, sales ("S"), returns ("R"), cash advances ("C"), and payments ("P"). It should be noted that any combination of the available transaction types may be allowed for a particular card type, depending on rules established by the issuer of a particular card product or the applicable card association. Thus, as described below, all of a merchant's purchase card transactions may be processed using the same merchant record, regardless of the transaction type.

Other information may also be provided. For example, label field 214 indicates a "label" to be associated with each card type. A label may be unique to a card type or may provide a convenient grouping of card types for reporting or other purposes. For instance, in FIG. 2, all card types for association V are assigned a label of "04," all card types for association M are assigned a label of "01," and all private label card types, regardless of issuer, are assigned a label of "09."

As another example, owner field 216 may be provided to identify the party responsible for issuing accounts corresponding to the card type. Where platform 100 is operated by a third-party processor that also provides card-issuer services, owner field 216 may be used where the card issuer is a client of the third-party processor. Where information about the owner is not useful, the field may be left blank. For instance, the Retailer H private label card type has "Client 1" identified as its owner. Identification of the owner may be by means of a code, a name, or any other identifier.

In an exemplary embodiment, platform 100 is under the control of a third-party provider of merchant services that maintains master card product list 200. In this exemplary embodiment, the third-party provider has a number of clients, each client being an acquirer that provides purchase card processing services to a number of merchants. These clients may desire (or be required) to process purchase card transactions for a particular presentation instrument in different ways. To support all such client preferences, a card product may be associated with multiple card types in master card product list 200. Some examples are illustrated in FIG. 2.

In one example, the same card product (e.g., group of prefixes 204) may appear in the master card product list 200 as two different card types 202 having different routing destinations 206. For instance, suppose that an acquiring bank in the U.S. is able to route card transactions directly to card association V, and suppose further that, due to Canadian banking laws, an acquiring bank in Canada is required to route such card transactions to another institution for forwarding to card association V. Master card product list 200 includes two card types that may be used for association V card products (e.g., card types "04001" and "04002"); the two card types associate the same prefixes 204 with different routing destinations 206. As will be described below, a merchant may be assigned one of these two card types, depending on the acquirer's needs or preferences.

In another example, the same group of prefixes 204 (corresponding, e.g., to a card product) may appear more than once in master card product list 200 with different routing destinations, thereby enabling co-branded card products to be provided. A co-branded card product bears two badges and is processed differently depending on where it is used. For instance, suppose that retailer D and card association A agree that retailer D may issue cards bearing both A's and D's badges. The agreement provides that the card is to be recognized and processed as product of card association A everywhere except in retailer D's stores, where it is to be recognized and processed as retailer D's private label card. Card association A selects a subset of its ISO prefixes (e.g., prefixes 395000–399999) to be used for the co-branded product.

To support this co-branded card product, master card product list 200 can define two different card types associated with the selected prefix group. One card type (e.g., card type "05001") associates the selected prefixes (and other prefixes belonging to association A) with the routing destination for association A card products; the other card type (e.g., card type "09003") associates the selected prefixes (but not other prefixes belonging to association A) with the routing destination for retailer D's private label card. As will be described below, merchants that are outlets of retailer D may be assigned the second card type, while other merchants are assigned the first card type. Because the card type definitions control processing, as described below, the same card is processed differently by platform 100 depending on where it is presented.

Another example relates to electronic debit networks, which generally do not issue any cards or have any ISO-assigned prefixes. Instead, a debit network provider enters into an agreement with a card issuing bank to handle debit transactions involving other cards (e.g., interchange cards) issued by the bank. Such transactions are generally routed through the designated debit network rather than through a card association interchange. To support electronic debit network transactions, master card product list 200 defines card types 202 for electronic debit cards as well. For these cards, prefix information may be provided in prefix field 204; alternatively, prefix information may be omitted ("n/a" in FIG. 2) and other methods may be used to identify the card type of such cards upon presentation to a merchant. Examples of processing debit network transactions will be described below.

It will be appreciated that master card product list 200 is illustrative, and that variations and modifications are possible. Master card product list 200 may be implemented using a database, one or more data files (e.g., VSAM files), or any other data storage technology. Master card product list 200 may provide other information than that described herein, and information may be provided in any suitable format. Master card product list 200 may also include more or fewer card types and is not limited to the examples shown.

Master card product list may define card types for any combination of interchange card products, private label card products, electronic debit network card products, and any other category of card products. It is to be understood that a "card type" is defined by master card product list 200 and may correspond to any arbitrary grouping of purchase cards. A specific presentation instrument may correspond to one or more card types.

In one embodiment of the present invention, master card product list 200 is defined by a third party provider to include every possible card product and transaction that the provider is capable of recognizing and processing. In general, because the third party provider acts as a proxy for an acquirer, there need not be any agreement in effect between the third party provider and a particular card association, network, or issuer. Master card product list 200 may be updated at any time (e.g., via user interface 125) to add, change, or delete card type definitions. In some embodiments, card type definitions may be added, changed, or deleted without requiring changes to any processing programs, except in cases where new routing destinations and/or formats are added.

To manage the needs and preferences of acquirer clients, a separate client-level card product list may be provided for each client. In one embodiment, a client-level card product list has the same format as master card product list 200, but generally includes fewer card types. In embodiments where master card product list 200 includes all cards and transactions that the third party provider is willing and able to process, each client-level card product list includes a subset of the entries in master card product list 200.

In an exemplary embodiment, a client-level card product list is generated by displaying master card product list 200 via user interface 125 and prompting a user to select one or more card types from the displayed list. The display may include all fields in master card product list 200 or any subset of the fields.

In some embodiments, a client-level card product list may include entries for any number of card types and any combination of card products, including interchange cards, electronic debit network cards, private label cards, and any other category of cards. Restrictions may be placed on which card products from master card product list 200 may be selected for inclusion in the client-level card product list. For instance, an agreement may be required between the client (i.e., the acquirer) and the card association providing for funds to be routed between the card association and the client in settlement of transactions of a particular type. Similarly, in some embodiments, the client may be limited to selecting only one routing destination for a particular card association. For instance, master card product list 200 includes two card types for association V (card types "04001" and "04002"). This signifies that the third-party provider provides two different routing options for the cards of association V (more than two options could also be provided by defining additional card types). An acquirer, however, may be required by its agreement with association V to route all its transactions to the same destination; accordingly, selection from master card product list 200 may be limited to one of the available card types for association V. In other instances, a client-level card product list may include two or more card types associated with the same prefixes (e.g., card types "05001" and "09003" could both be included).

In some embodiments, creation of the client-level card product list may also involve adjusting the settlement flag. A settlement flag value "Y" in master card product list 200 signifies that the provider is capable of performing settlement on the client's behalf. A particular client, however, may prefer not to have the provider perform this function, in which case the flag value may be reset to "N" in the client-level card product list 200 for that client. (In this example, a settlement flag value of "N" in master card product list 200 would signify that the provider does not perform settlement and would generally not be overrideable at the client level.)

In one embodiment, a client-level card product list is created when the third-party provider signs up a new client. The client-level card product list may be updated when master card product list 200 is updated (e.g., when a new card product or a new option for processing existing card products becomes available), as well as when the client's agreements with various card issuers, associations, or networks change.

It should be noted that providing a client-level card product list is optional. In some embodiments, such a list may facilitate building of merchant card type lists and processing of transactions, as will be described below. In embodiments where there is no third-party provider, master card product list 200 would be under the direct control of an acquirer and would reflect the particular processing preferences of the acquirer; accordingly, a separate client-level card product list can be omitted.

In order to control transaction processing on a merchant-by-merchant basis, card type information is also provided for each merchant. An embodiment of merchant card type information will now be described. As noted above, platform 100 includes a merchant master data store 110. In one embodiment, data store 110 contains a record related to each merchant for which processing services are provided by platform 100. Merchant master data store 110 is used by various merchant processing applications, examples of which will be described below. Merchant master data store 110 is maintained by an acquirer or by a third-party provider. (Optionally, a merchant may be authorized to update certain information in merchant master data store 110 directly.)

Figure 3:
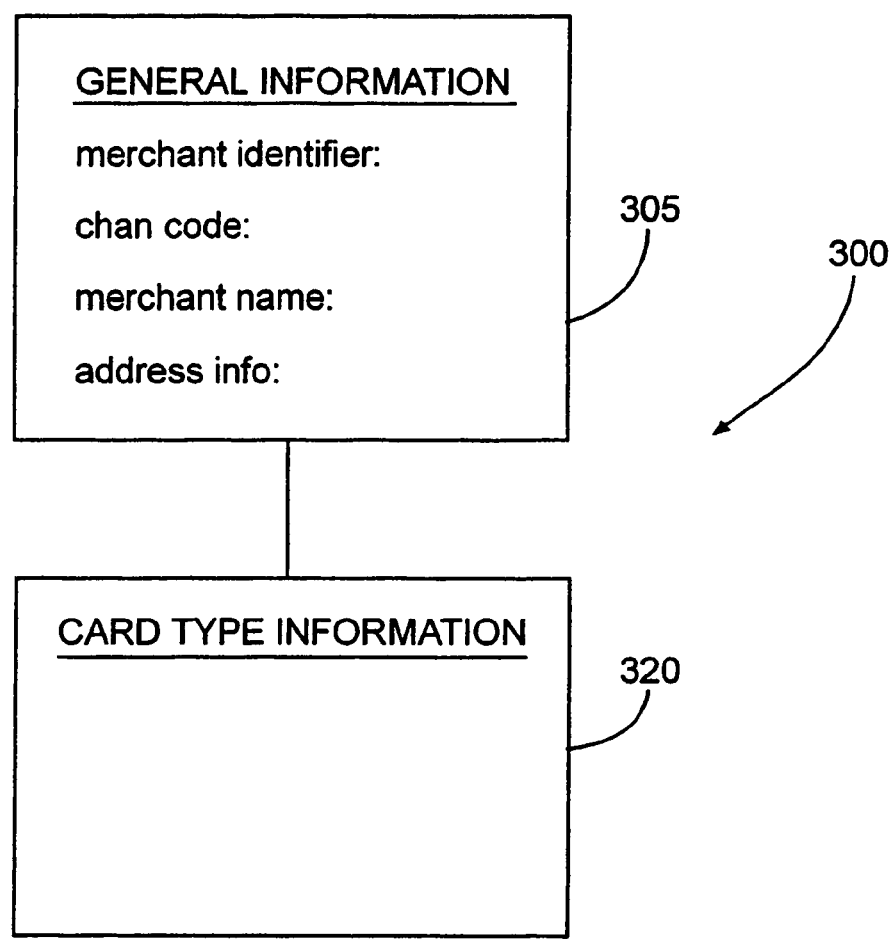
FIG. 3 is a simplified block diagram of a merchant master database record according to an embodiment of the present invention.

An exemplary embodiment of a merchant record 300 in merchant master data store 110 is shown in FIG. 3. The information in merchant record 300 is organized into a number of sections, each containing one or more fields. General information section 305 includes the merchant's name and contact information, including an address for the merchant. General information section 305 also includes a merchant identifier, such as a number or alphanumeric code, that uniquely identifies the merchant record 300. The merchant identifier may also identify the merchant's location within a hierarchical grouping of merchants, as will be described below. If the merchant is an outlet in a chain of stores, a chain code may be used to indicate the merchant's association with the chain. Where a chain code is provided, all merchants in a particular chain share the same chain code. As will be described below, chain codes may be used to implement common card type acceptance rules for all outlets of the chain.

Figures 4, 5B:
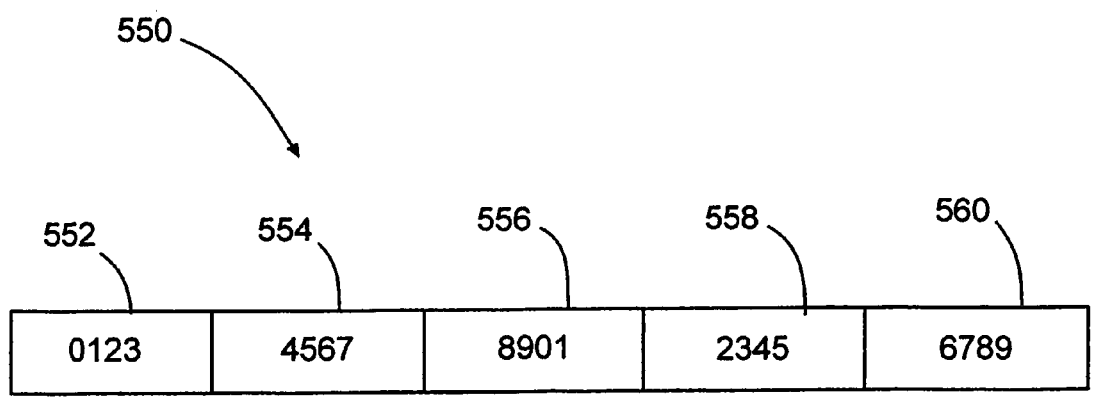
FIG. 4 is a table representing contents of a merchant card type list according to an embodiment of the present invention.
FIGS. 5A–B are, respectively, a simplified block diagram of a hierarchical arrangement for merchant records and a structure diagram for a numerical representation of the hierarchical location of a merchant, according to an embodiment of the present invention.

Merchant master record 300 also includes a merchant card type information section 320. This information either includes or can be used to build a merchant card type list 400, an example of which is shown in FIG. 4. Merchant card type list 400 establishes the card types that a merchant is allowed to accept, the allowed transaction types for each card, and other information used by platform 100 to process transactions for the merchant. In one embodiment, each entry in merchant card type list 400 includes a card type identifier 402, a set of prefixes 404 associated with the card type identifier, an authorizations flag 406, a tickets flag 408, a reimbursement flag 410, an Automated Clearinghouse (ACH) flag 412, and a transaction type indicator 414. As will be described below, the various fields in merchant card type list 400 are used to control processing of all card product transactions submitted by the merchant.

Card type identifier 402 is one of the card type identifiers 202 appearing in master card product list 200 described above. As will be described below, card type identifier 402 serves as a link between transaction processing parameters that are maintained at the merchant level and additional transaction processing parameters that are maintained at the acquirer or third-party provider level.

Prefix field 404 identifies one or more card prefixes (or blocks of prefixes) that map to the corresponding card type identifier 402 for the merchant. In general, prefix field 404 for a particular card type identifier 402 is the same as the prefix field 204 corresponding to the same card type identifier 202 in master card product list 200; in some embodiments, exceptions may be made, as will be described below.

Merchant card type list 400 also includes merchant-specific information that is not included in master card product list 200. This enables further tailoring of transaction processing to the specific requirements and preferences of individual merchants and acquirers. For example, as is known in the art, some merchants are permitted to submit both authorizations and tickets for processing for a particular card product, while other merchants are allowed to submit only one of the two. In merchant card type list 400, authorizations flag 406 and tickets flag 408 indicate whether the merchant is allowed to submit authorization transactions and ticket transactions, respectively.

Similarly, different merchants may be authorized to accept different transaction types (e.g., sales, returns, cash advances, and payments). Transaction types field 414 includes an indicator for each of one or more transaction types that the merchant is allowed to accept for the card type associated with card type identifier 402. The indicators used are preferably the same as for transaction types field 212 in master card product list 200. It should be noted that transaction types field 414 in merchant card type list 400 may include all, some, or none of the transaction types that appear in the corresponding field 212 of master card product list 200.

Reimbursement flag 410 and ACH flag 412 are used during processing of transactions involving funds transfers to control whether, how, and when funds are transferred. The use of these flags will be described below.

It will be appreciated that merchant card type list 400 is illustrative, and that variations and modifications are possible. Merchant card type list 400 may be maintained as a structure within merchant master record 300, or in a separate data file (e.g., a VSAM file) that can be accessed, for example, by using the merchant identifier or via a link from merchant master record 300. In one embodiment, data for merchant card type list 400 is maintained in merchant master record 300 in merchant master data store 110, and a VSAM file for each merchant is periodically back-built from merchant master data store 110. The back-building process may also use other information stored in card product data store 117. One such process will be described below.

Merchant master record 300 may also include any other information needed to process and report the merchant's purchase card activity. One example of a merchant master record is described in further detail in co-pending U.S. patent application Ser. No. 10/245,789, filed Sep. 17, 2002, the disclosure of which is incorporated herein by reference.

It will be appreciated that merchant record 300 is illustrative, and that the content and arrangement of merchant record data may be varied in specific embodiments. Moreover, merchant master data store 110 may be implemented using any suitable data management technology, including well-known database products.

Figure 5A:
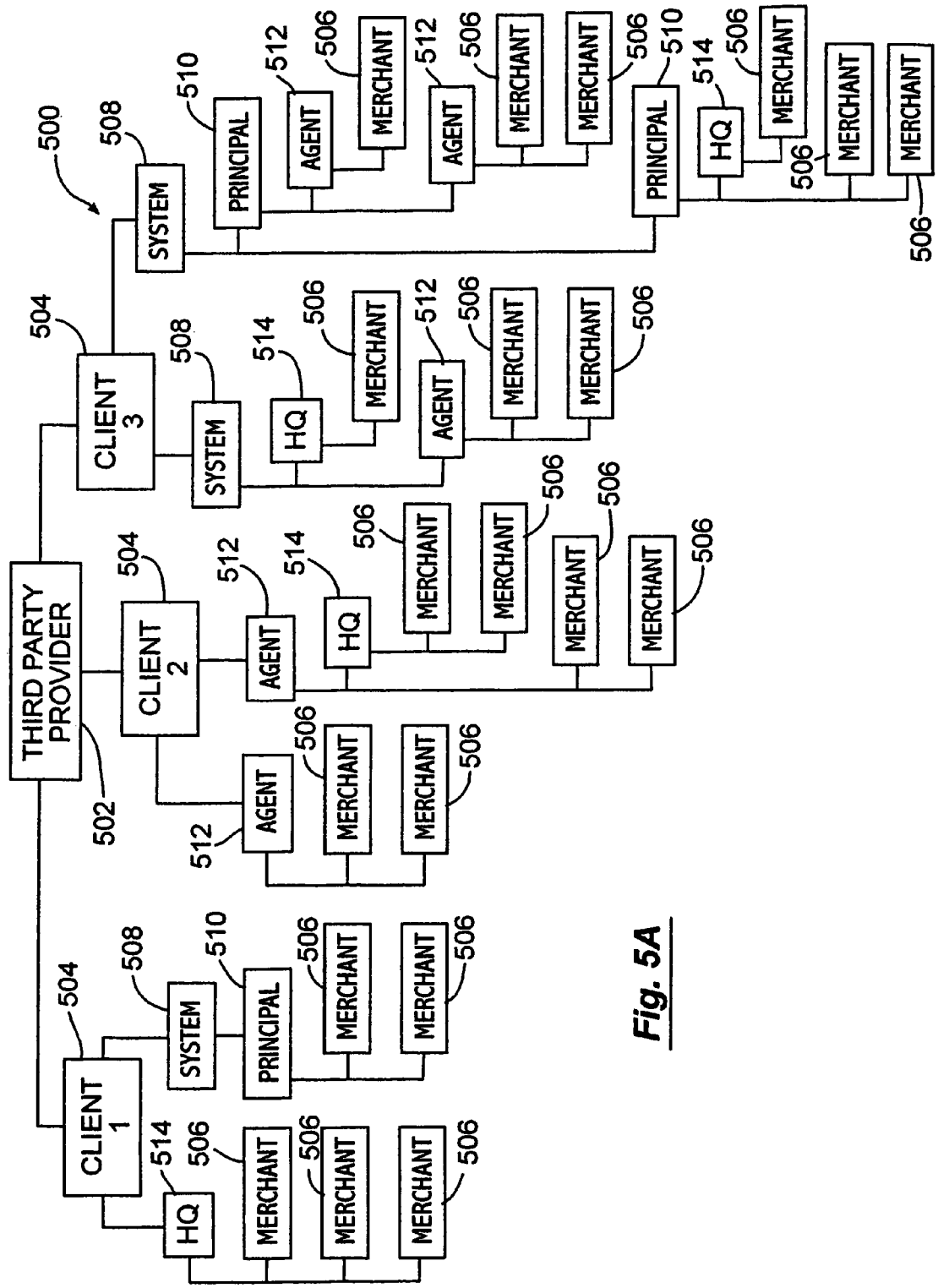

In some embodiments of the present invention, merchant records 300 within merchant master data store 110 may be organized hierarchically for reporting or other purposes, including establishing which card types a merchant is authorized to accept, as will be described below. An example of a hierarchical organization 500 is shown in FIG. 5A. At the top of the hierarchy 500 is a third-party provider 502. The third party provider provides services to clients (acquirers) 504. Each client provides purchase card processing services for a number of merchants 506. Each merchant 506 has a corresponding merchant record 300 in merchant master data store 110. The hierarchical organization 500 provides for intermediate groupings of merchant accounts, labeled (in descending order) "System" 508, "Principal" 510, "Agent" 512, and "Headquarters" 514. Not all intermediate groupings need be present; for instance, client "1" has a headquarters 514 without a system, principal, or agent. Client "2" has agents 512 without a system or principal.

In general, hierarchical organization 500 allows a client 504 to organize its portfolio of accounts for merchants 506 in any convenient manner by establishing structure at some or all of the intervening levels. For instance, a client 504 may elect to group together all outlets of a chain by associating all such merchants with a common headquarters 508. Agents 512, principals 510, and systems 508 each represent successively larger groupings of merchant accounts 506, and reporting of account status and activity may be provided to the client at each of these levels. Acquirers may use hierarchy 500 to organize their merchant account portfolios by industry, geography, association with affiliate banks, or any other common threads. Thus, hierarchy 500 may be used by an acquirer or third-party service provider to manage a large portfolio of merchant accounts without implementing multiple merchant databases.

In some embodiments, the merchant identifier in merchant record 300 reflects the hierarchical structure. For instance, as illustrated in FIG. 5B, a merchant identifier 550 may be a numerical code made up of several blocks of digits. A first block 552 indicates a client 504 of the third-party provider, a second block 554 indicates a system 508, a third block 556 indicates a principal 510, and a fourth block 558 indicates an agent 512. A fifth block 560 is used to uniquely identify merchant accounts 506 within the agent level. In this embodiment, a headquarters 514 (if one is defined) is identified by a separate chain code within merchant master record 300; alternatively, association with a headquarters could be indicated by an additional block of digits in merchant identifier 550. If a hierarchical level is absent, the corresponding block of digits may be set to all zeroes or another default value.

In some embodiments, hierarchy information may be used in determining the card types that a merchant is allowed to accept, as will be described further below. It will be appreciated that the hierarchy presented here is an example, and that merchant processing systems according to the present invention may be implemented with other hierarchies or with no hierarchy.

Figure 6:
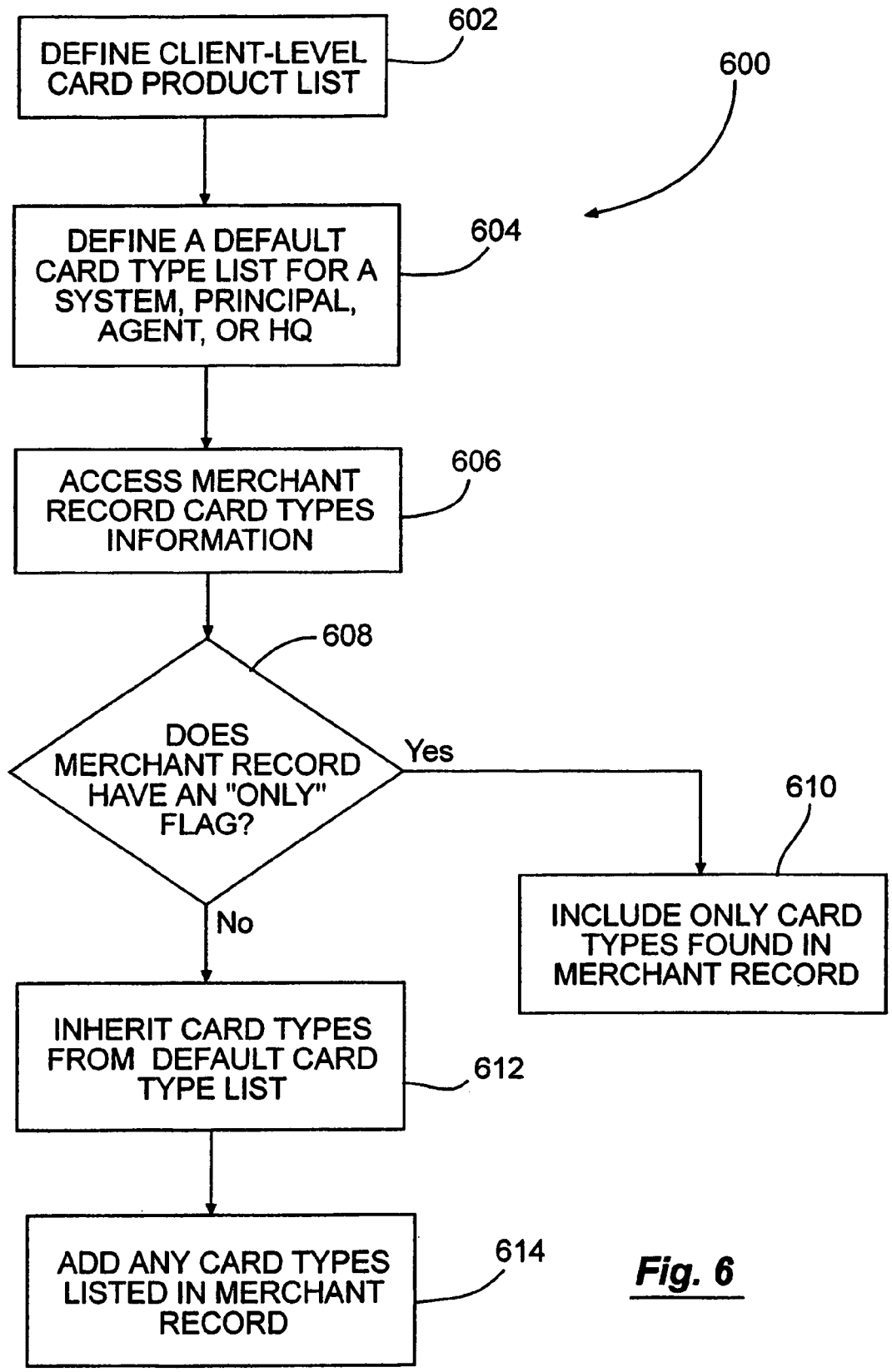
FIG. 6 is a flow chart of a process for building a merchant card type list according to an embodiment of the present invention.
Figure 7:
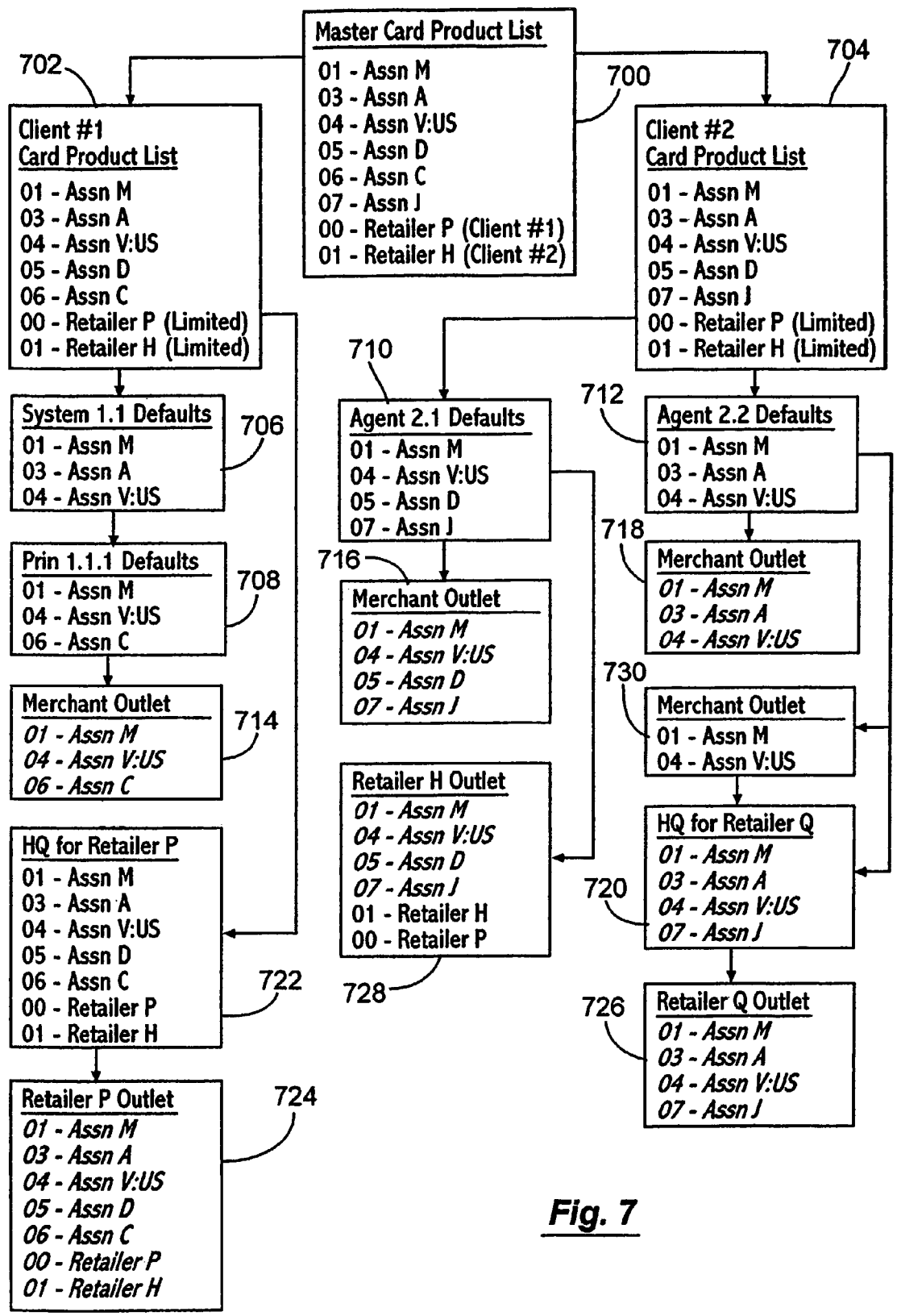
FIG. 7 is a simplified block diagram of relationships of various card type lists according to an embodiment of the present invention.

Hierarchy 500 may be used to simplify building of merchant card type lists 400, as will now be described. FIG. 6 illustrates a process 600 for building a merchant card type list 400 using information stored in merchant record 300 as well as one or more default card type lists stored in card product data store 117. FIG. 7 illustrates specific examples of card type lists that could be used in or generated by process 600. In general terms, process 600 involves defining default card type lists for various hierarchical levels and causing merchant card type lists to inherit the contents of an appropriate default list.

More specifically, at step 602, a client-level card product list is defined, e.g., prompting a user to select one or more card types from a master card product list, as described above. FIG. 7 illustrates two client-level card product lists 702, 704 for two clients ("Client #1" and "Client #2") that could be generated from a third-party provider master card product list 700. For clarity of presentation, the card type lists in FIG. 7 include only a card type identifier and a name; it is to be understood that other information may also be included; for instance, the format of master card product list 200 and/or merchant card type list 400 could be used. In some instances, step 602 may involve accessing a previously defined client-level card product list stored in card product data store 117.

At step 604, one or more default card type lists are generated. These lists may have the same format as merchant card type list 400 described above. Each default card type list is associated with a particular location in a merchant hierarchy 500 defined by the client. For instance, in FIG. 7, "Client #1" has defined a default card type list 706 for a system "1.1," a default card type list 708 for a principal "1.1.1" and a default card type list 722 for a headquarters of a chain of retailers P. "Client #2" has defined a default card type list 710 for an agent "2.1," a default card type list 712 for another agent "2.2," and a default card type list 720 for a headquarters of a chain of merchants Q. Each default card type list has entries corresponding to some (or all) of the card types included in the respective client's master card product list 702, 704. A client may define a default list for some or all of the hierarchical locations it has defined. In some instances, step 604 may involve accessing one or more previously defined default card type lists stored in card product data store 117.

In one embodiment, a default card type list (e.g., list 706) is defined by displaying the appropriate client-level card product list (e.g., list 702) via user interface 125 and allowing a user to select one or more card types to be included in the default card type list. Default card type lists generally include all of the information provided in merchant card type list 400. Some of this information (e.g., authorization, ticket, and reimbursement flags) might not be included in the client-level card product list. Thus, upon addition of a card type to the default card type list, the user may be prompted to supply this information. Default values for the additional fields could also be provided, with the user having the ability to override the default values. It will be appreciated that any card type included in the client-level card product list may be included in a default card type list for that client.

In an exemplary embodiment, building card product and card types lists (steps 602 and 604) occurs as circumstances warrant, e.g., when an acquirer's agreements with various card issuers, associations, and networks change. The default card type lists may be stored in card product data store 117 and accessed periodically for building of merchant card type lists.

At step 606, the merchant record 300 for a particular merchant is accessed. In one embodiment, merchant record 300 includes at least a card type identifier corresponding to every card type the merchant is allowed to accept. Alternatively, the merchant card type list "inherits" card types from one (or more) of the default card type lists.

To determine whether the merchant card type list for a particular merchant is to include inherited card types, at step 608, merchant record 300 is checked for an "only" flag, which indicates that no card types are to be inherited. In one embodiment, the "only" flag is stored in association with one or more card types included in card type information section 320 of merchant record 300.

If the "only" flag is not asserted, then at step 612 the merchant card type list inherits one or more card types from a default card-type list at a higher hierarchical level. For example, merchant card type list 718 inherits three card types (indicated by italic type) from agent-level default card type list 712. In one embodiment, each merchant inherits from only one default card type list. For example, merchant card type list 714 inherits only the card types in principal-level default card type list 708; the system-level default card type list 706 is not inherited, and consequently merchant card type list 714 does not include the association A card type.

At step 614, any card types expressly included in merchant record 300 are added to the inherited list. For example, merchant card type list 728 includes the card types for retailer H and retailer P in addition to the four card types inherited from agent-level default card type list 710. In general, any card type included in the client-level card product list may be added to the merchant card type list for any merchant. Thus, one merchant may be able to accept any combination of card types.

If the "only" flag is asserted, then at step 610, the merchant card type list 400 is built including only those card types expressly included in merchant record 300, regardless of any default card type list that may exist. For example, in FIG. 7, merchant card type list 730 includes only the association M and association V card types, with the "only" flag. Merchant card type list 730 does not inherit the association A card type from agent-level default card type list 712.

In some embodiments, the headquarters level is handled differently from other intermediate levels of the hierarchy. For instance, while a principal-level default card type list is not built by inheriting a system-level default card type list, a headquarters-level card type list can be built by inheritance. For example, headquarters-level card type list 720 inherits card types from agent-level default card type list 712. The headquarters-level card type list may also include card types other than the inherited types; for instance, headquarters-level card type list 720 adds the "association J" card type. Alternatively, headquarters-level card type lists may be established without inheritance, e.g., headquarters-level card type list 722. Merchants associated with a chain generally inherit card types only from the chain headquarters; e.g., merchant card type list 724 inherits from headquarters-level card type list 722, and merchant card type list 726 inherits from headquarters-level card type list 720.

In an exemplary embodiment, a merchant card type list 400 provides a unique mapping from a card prefix to a card type identifier. In many instances, card issuers and associations select prefixes according to standards established in the industry ("ISO standards"), which are designed to allocate prefixes uniquely among various issuers and associations. (For instance, under one set of rules known in the art, any ISO-compliant presentation instrument whose first digit is "4" is a VISA product; any card whose first digit is "5" is a MASTERCARD product, and so on.) In cases where an issuer chooses to ignore the ISO standards (e.g., a private label issuer who does not want its cards to be widely accepted), however, duplication of prefixes is possible. It is also possible to have duplication of prefixes at the client level, e.g., because of the need to accommodate different processing procedures and/or acceptance of non-ISO-compliant card products for different merchants.

Thus, process 600 may include error-checking to verify that the mapping from card prefixes to card type identifiers within a merchant card type list 400 is unique. In the event that adding a card type causes a prefix to map to two card type identifiers, a warning is generated and the user is required to remove one of the card types. In an alternative embodiment, duplication is allowed, and the merchant is required to provide additional information besides the card number in order to complete a transaction, as will be described further below. In general, any such information can be stored as part of prefix field 404 in merchant card type list 400, or in a separate field used in conjunction with prefix field 404.

As described above, inheritance can be prevented using the "only" flag for a particular merchant. Inheritance can also be prevented at the client level. For example, a client may prefer to allow only selected merchants to accept a particular card product; e.g., the client may want only retailer P's stores or a few selected other retailers to accept retailer P cards. To prevent inheritance that might inadvertently enable non-selected merchants to accept the card product, the client may set a "Limited" flag in the client-level card product list, as indicated in lists 702, 704. The "Limited" flag prevents inadvertent inheritance by indicating that the card type is not to be inherited. Thus, regardless of any hierarchical structure, merchants do not inherit this card type. To permit inheritance, the card type must be expressly added to a list at a lower level, without the "Limited" flag. For instance, headquarters-level card type list 722 (the chain headquarters for retailer P) includes the retailer P card type without the "Limited" flag; thus merchant card type list 724 can inherit the retailer P card type despite the "Limited" flag in client-level card product list 702.

It is to be noted that the content of a merchant card type list is not restricted. In general, any card product may be included in any merchant card type list, regardless of the card association, the interchange or private label status of the card product, the allowed transaction types, or other such considerations. Further, the presence or absence of a particular card type from any default card type list does not prevent the card type from being included in a merchant card type list. It will be appreciated that appropriate agreements between the parties (i.e., merchant, acquirer, and card issuer or association) should generally be in place before allowing a merchant to accept a particular card type, but once those agreements are in place, platform 100 is able to support the merchant's acceptance of the issuer's products, regardless of the issuer's identity. Thus, merchant card type lists 724, 728 are each able to include both the retailer P and retailer H card types.

It will be appreciated that process 600 is illustrative, and that variations and modifications are possible. For instance, it is not necessary to generate new client-level card product lists or default card type lists every time a merchant card type list is to be generated. Such lists may be stored in card product data store 117 and accessed for purposes of building merchant card type lists. Depending on implementation, generation of merchant card type lists may be done periodically for all merchants and/or on demand for one or more merchants in response to a user request. In addition, default card type lists are not required; a merchant card type list could be populated manually for each merchant. It should be noted, however, that manual population of merchant card type lists may increase the data-entry burden when creating new accounts. Any number of default card type lists may be created, and a client may, for example, have default card type lists for some of its systems (or principals or agents) but not all.

Examples of processing purchase card transactions (authorization, ticket acquisition, and settlement) using platform 100 and merchant card type list 400 for a particular merchant will now be described.

Figure 8:
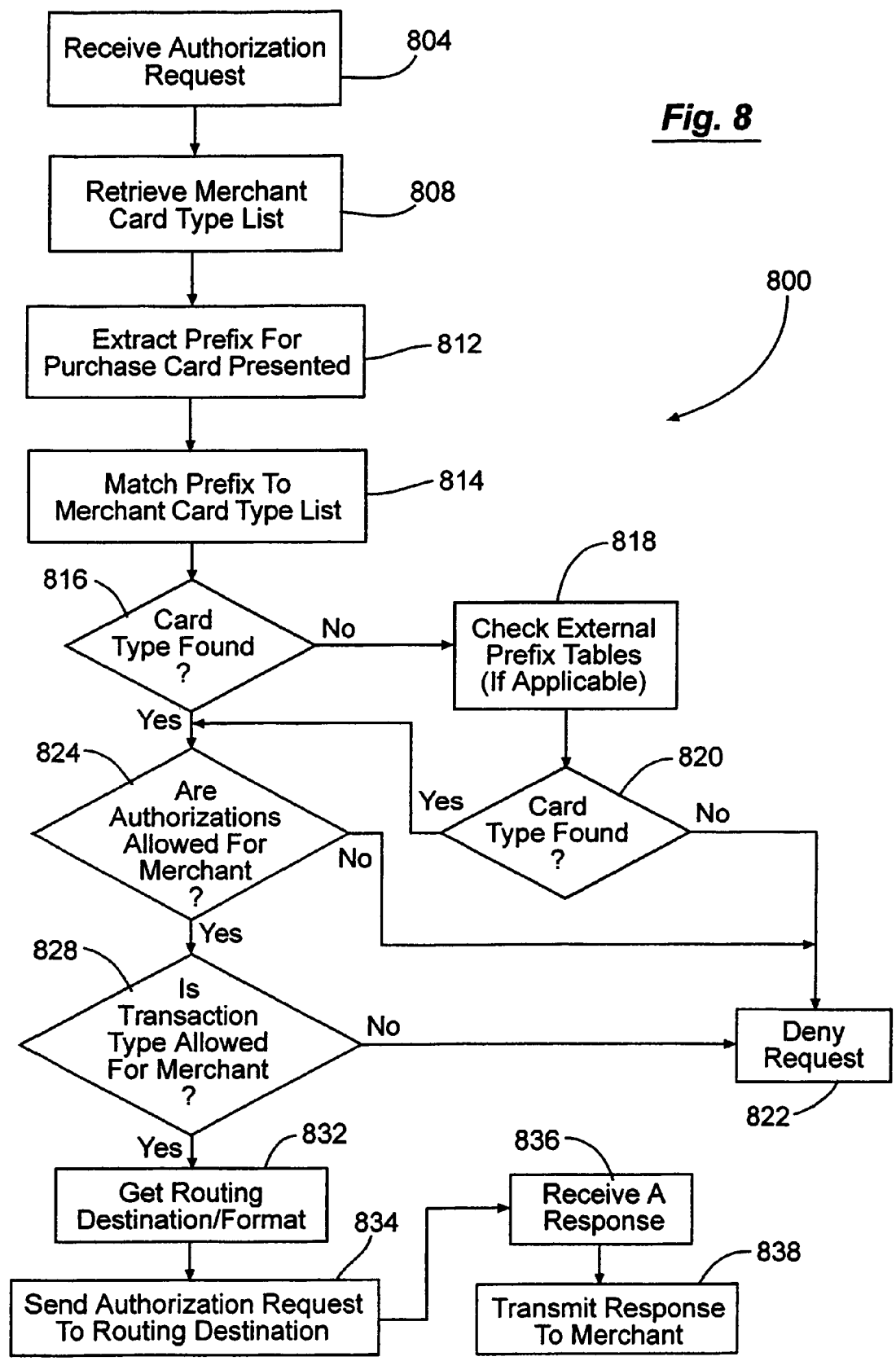
FIG. 8 is a flow chart of authorization request processing according to an embodiment of the present invention.

FIG. 8 is a flow chart of an exemplary process 800 for an authorization transaction according to the present invention. During authorization, the merchant processing platform 100 first determines whether the merchant is authorized to accept the presentation instrument (or card) presented by a customer. The merchant is authorized to accept the card if a corresponding card type appears in the merchant card type list and the transaction-type indicator corresponding to the contemplated transaction (e.g., sales if the card is presented for a purchase) is present. Then the validity of the cardholder's account is determined, generally by routing the authorization request to the card association or issuer for approval. The process results in an approval or denial message being returned to the merchant. From the merchant's perspective, all card products may be handled in the same way; for instance, the merchant may have one point-of-sale (POS) terminal used to swipe all cards and transmit appropriate information to the acquirer.

More specifically, at step 804, transaction data for the authorization transaction is received from the merchant, e.g., via transmission from a POS terminal over a dialup connection. The transaction data includes at least an identifier of the merchant, the account number of the presentation instrument, and an indication of the transaction type of the proposed transaction for which authorization is sought (e.g., sales, cash advance, payment). Other information, such as a proposed transaction amount and transaction-specific information (e.g., an itinerary in the case of an authorization for an airline ticket purchase) may also be included. Various techniques for providing transaction data are known in the art and may be employed to provide transaction data to process 800. At step 808, the merchant card type list for the merchant is retrieved. For instance, the data received at step 804 may include a numerical merchant identifier that can be used at step 808 to access a VSAM file containing the merchant card type list.

At step 812, a prefix is extracted from the account number of the presentation instrument. The prefix may be defined as an arbitrary number (e.g., up to 15) of digits starting from the first digit in the account number. The prefix generally includes enough digits to unambiguously match the presentation instrument to one of the card types in the merchant card type list for the merchant.

At step 814, the prefix is compared to the various prefix fields 404 included in merchant card type list 400 for the merchant. If a matching prefix is found in merchant card type list 400, the corresponding card type identifier 402 is selected as the card type for the transaction. At step 816, if no card type has been found, then the process checks external card prefix tables (e.g., the association V table) at step 818. Process 800 may be implemented so that checking of external card prefix tables is conditioned on certain events. For instance, in one embodiment, a particular external card prefix table is checked only if merchant card type list 400 indicates that the merchant accepts cards listed in that table; e.g., the association V card prefix table would be checked only if merchant card type list 400 for a particular merchant contains a card type that references the association V card prefix table. Also, the process may be implemented so that the external table is checked only for prefixes where a match is possible; e.g., if association V uses only prefixes beginning with "4", then the association V prefix table would be checked only if the first digit of the presentation instrument's prefix is "4". At step 820, if no card type matching the prefix of the presentation instrument has been found, the authorization request is denied at step 822. A denial message is returned to the merchant; preferably, the denial message also informs the merchant that the card is not of a type the merchant is allowed to accept.

At step 824, having determined the card type, the corresponding authorizations flag 406 in merchant card type list 400 is checked to determine whether the merchant is allowed to submit authorization transactions for the card type 402. If not, the authorization request is denied at step 822, preferably with a message indicating that the merchant cannot submit authorization transactions for the card type. It should be noted that because the authorizations flag for a card type is controlled at the individual merchant level, platform 100 can process transactions for all merchants, regardless of whether each merchant is allowed to submit authorization tickets for a particular card type.

At step 828, the proposed transaction type received in the transaction data is compared to the list of supported transaction types 404 for the identified card type 402 in merchant card type list 400 to determine whether the merchant is allowed to submit transactions of the proposed type. If the transaction type is not allowed, the authorization request is denied at step 822, preferably with a message indicating an invalid transaction type. It should be noted that because allowed transaction types for a card type are controlled at the merchant level, platform 100 can process transactions for all merchants, regardless of which combination of transaction types each merchant is allowed to accept for a particular card type.

Successful completion of step 828 establishes that the merchant is allowed to accept cards of the type presented for transactions of the contemplated type. The remaining steps deal with validating the cardholder's account by providing the card issuer or association with the transaction data. In appropriate circumstances, these steps may be omitted (e.g., if the card issuer's rules do not require advance validation of the account).

At step 832, a routing destination and format are determined based on the card type identifier. In one embodiment, this is done by using the card type identifier to retrieve a routing field from the client-level card product list. In an alternative embodiment, merchant card type list 400 is built to include a routing field (e.g., by duplicating the routing field from the client-level card product list). The routing field identifies a routing destination and may also include formatting information so that the authorization request can be transmitted in an appropriate format. At step 834, the authorization request is transmitted to the routing destination; any required formatting is done prior to transmitting the request. At step 836, a response is received from the card issuer or association. The response generally includes an approval or denial and may include other information, such as an authorization number (in the case of an approval), an indication of a reason for denial, or a request to instruct the cardholder to contact the card issuer. At step 838, the response is forwarded to the merchant.

It will be appreciated that process 800 is illustrative and that process steps described herein may be modified or varied. For instance, steps 824 and 828, each of which involves checking the merchant card type list 400, may be combined. Process 800 is, in general, unaffected by any particular authorization procedures that may be used by a card issuer or association to decide whether to grant or deny a request. Process 800 may also include additional steps related to reporting or logging of authorization activity, including approvals, denials, and the basis for any denials, as well as other steps known in the art.

In some embodiments, platform 100 may also process purchase card transactions via electronic debit networks in addition to (or instead of) card associations. As described above, debit networks generally do not own any card prefixes or issue any cards; instead, debit network providers enter into agreements with individual banks to associate themselves with that bank's card products, which are typically issued under prefixes established by a card association.

Figure 9:
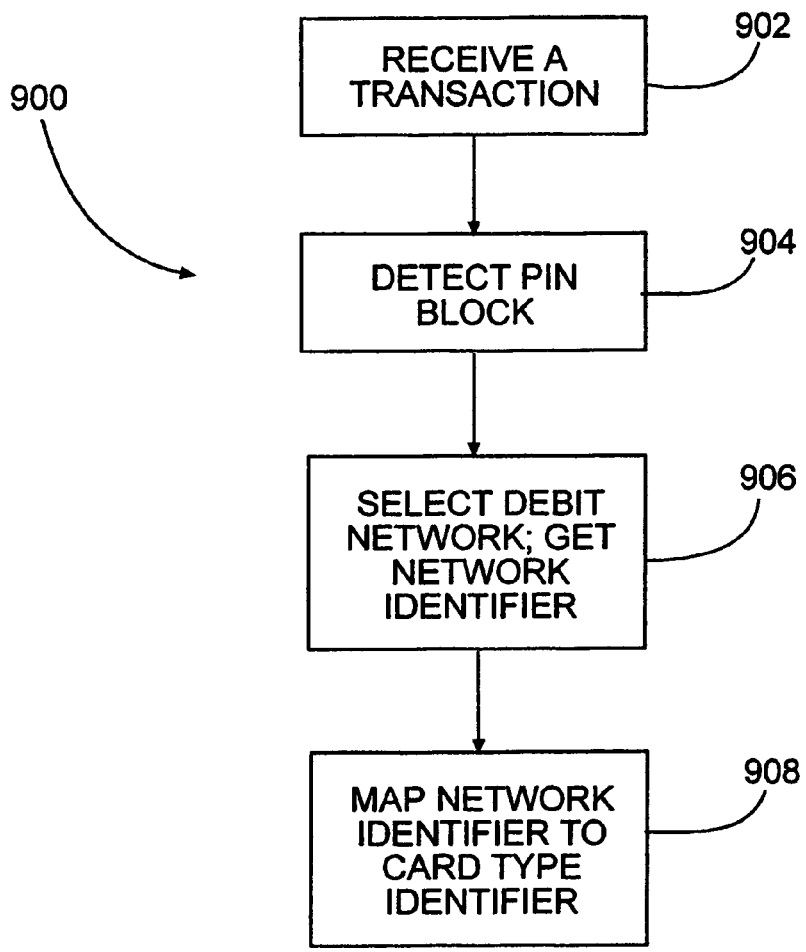
FIG. 9 is a flow chart of processing a debit-network transaction according to an embodiment of the present invention.

FIG. 9 illustrates an exemplary embodiment of a process 900 for determining a card type for a transaction that is to be handled via a debit network. Such transactions are distinguishable from other transactions by the presence of a "PIN block" (an encoded version of the personal identification number, or PIN, that the cardholder is required to enter before the merchant submits the transaction) in the transaction data. When a transaction is received at step 902, process 900 first checks for the presence of a PIN block (step 904).

At step 906, when a PIN block is detected, the appropriate debit network is selected. A number of techniques for selecting a debit network are known in the art. In one embodiment, each acquirer that accepts debit network transactions has agreements with one or more networks and prioritizes the networks according to fees charged and/or other criteria. When a presentation instrument is associated with multiple debit networks, the priorities established by the acquirer are used to determine which of the networks is to process the transaction. In one embodiment, platform 100 does not select the network, but instead communicates with an outside agency (e.g., Electronic Data Systems) that performs the appropriate network selection operation and returns an identifier of the selected network to platform 100.

At step 908, process 900 locates the network identifier in merchant card type list 400, thereby determining the card type for the transaction. Once the card type is determined via process 900, processing of debit network transactions may proceed similarly to the processing described above with regard to FIG. 8, beginning at step 824.

It will be appreciated that process 900 is illustrative and may be modified or varied. For instance, platform 100 can include the information needed to select an electronic debit network without using an outside agency; such processes are known in the art.

In addition, processes 800 and 900 can be combined. In the combined process, upon receipt of a transaction, platform 100 first searches for a PIN block in the transaction data. If no PIN block is found, then the card type for the transaction is determined using steps similar to steps 808 through 820 described above. If a PIN block is found, then steps similar to process 900 are invoked to determine the card type. Once the card type is known, processing of both sorts of transactions may follow the same steps.

Figure 10:
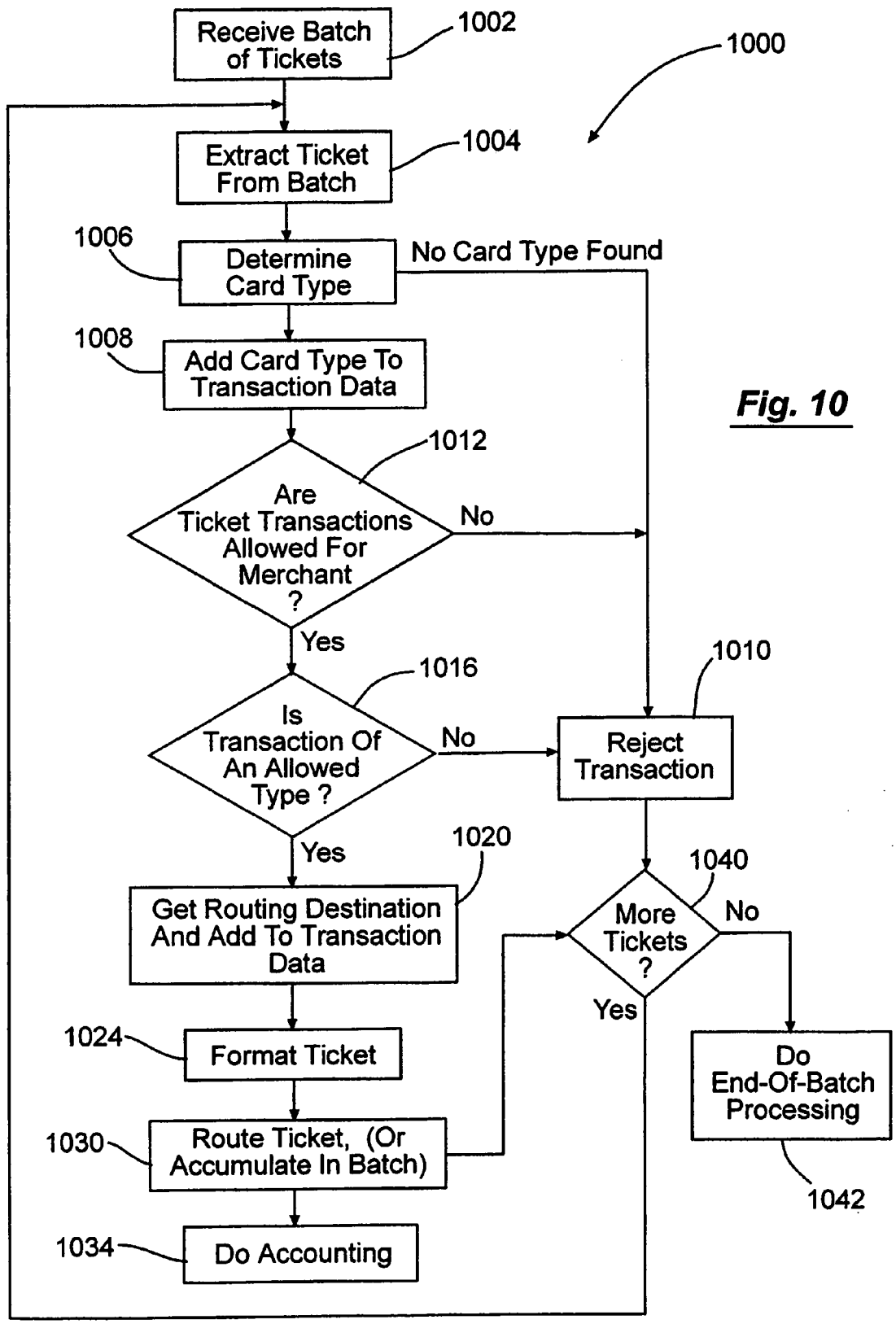
FIG. 10 is a flow chart of acquisition processing for a batch of tickets according to an embodiment of the present invention.

FIG. 10 is a flow chart of an exemplary process 1000 for processing of ticket acquisition and settlement by platform 100. The process will be described for the case where platform 100 is operated by a third-party provider of merchant services; it will be appreciated that a similar process could be implemented in the case where platform 100 is operated by an acquirer. In on embodiment, platform 100 receives a batch of tickets from a merchant. Each ticket corresponds to a merchant-customer transaction and includes the account number of the presentation instrument, the transaction type, and the transaction amount. The ticket may also include other information, such as an authorization code, the transaction date, transaction details (e.g., an itinerary if the transaction relates to an airline ticket purchase), and so on. The batch may include transactions of any allowed type using any allowed card product in any order. Each ticket is extracted from the batch in turn, processed, and routed to the appropriate card issuer, association, or network.

More specifically, at step 1002, a batch of tickets is received from a merchant. It is to be understood that step 1002 may also include pre-processing steps such as matching tickets to authorization records, conversion of paper tickets to electronic form, and the like. At step 1004, a ticket is extracted from the batch, and at step 1006 the card type is determined. Determination of card type at step 1006 generally involves using the merchant card type list 400 for the merchant and may proceed in a manner similar to the card-type determination steps of process 800 described above. Where debit-network transactions are also processed, the card-type determination steps of process 900 may be used as well. As noted above, processes 800 and 900 may be combined so that the card type can be determined for any presentation instrument. At step 1008, the card type identifier is added to the transaction data. If the card type cannot be determined at step 1006, the transaction is rejected at step 1010. Procedures for handling rejected transactions are known in the art and generally include notifying the merchant that the transaction was rejected.

At step 1012, the tickets flag 408 corresponding to the identified card type 402 in merchant card type list 400 is checked to determine whether the merchant is allowed to submit tickets for the identified card type. If not, the transaction is rejected at step 1010. At step 1016, the transaction type submitted by the merchant is checked against the allowed transaction types 414 for the identified card type 402. Again, if the merchant is not allowed to accept transactions of the submitted type, the transaction is rejected at step 1010. Steps 1012 and 1016 may be implemented similarly to steps 824 and 828 of process 800 described above.

If the card type and transaction type are valid for the merchant, the transaction is processed. At step 1020, a routing destination is determined and added to the transaction data. As described above with regard to process 800, the routing destination may be determined by reference to a client-level card product list; in an alternative embodiment, the routing destinations are stored in merchant card type list 400 and determined from that list.

At step 1024, the transaction data is formatted appropriately, as determined by routing information parameters associated with the identified card type. In one implementation, a routing information parameter is used as a switch to select from a group of available formatting processes. Formatting of transaction data may be done using any suitable techniques, a number of which are known in the art.

In some embodiments, formatting of the transaction data includes determining an account identifier under which the ticket is to be reported to the card issuer, association, or network. For example, in some embodiments, platform 100 identifies merchants and acquirer clients using internal numerical identifiers. These identifiers might not match the identifiers assigned to the same merchants and acquirers by card issuers or associations (e.g., "ICAs" assigned by MASTERCARD or "BINs" assigned by VISA). Thus, before routing the transaction data to the card issuer, it is necessary to attach an identifier of the acquirer and/or merchant that the card issuer or association can recognize.

In one embodiment, the determination of an issuer-side identifier is accomplished using a Combined Deposit Table. The Combined Deposit Table maps a combination of the merchant identifier (or a portion thereof) and card type to a reporting identifier to be used for reporting and routing of transactions. The Combined Deposit Table may be configured to return a result for any merchant/card-type combination; in instances where the result is not needed for routing, it may still be used for reporting purposes. In this way, the merchant identifier used by platform 100 is made independent of identifiers that may be required by a card issuer, association, or network to which the transaction is routed. Thus, platform 100 may process any card type for any merchant without maintaining multiple merchant records under different merchant identifiers.

At step 1030, the transaction is routed to the routing destination. In some embodiments, platform 100 may also handle issuer-side processing for certain card types (e.g., some private label card products), in which case the routing destination is platform 100. In other cases, the transaction may be routed to other platforms operated by the operator of platform 100 or to outside destinations operated by various card issuers, associations, and networks. In general, step 1030 may involve accumulating data for multiple transactions involving the same card type(s) and transmitting data in batches. As is known in the art, transactions may be batched at the level of merchants or using any other useful grouping (e.g., all transactions for a client). Multiple batches may be accumulated in parallel for different routing destinations, and/or for different transaction types (e.g., sales could be accumulated in a batch separate from payments) according to the requirements of the card issuer, association, or network. Thus, tickets may be processed in any order.

Figure 11:
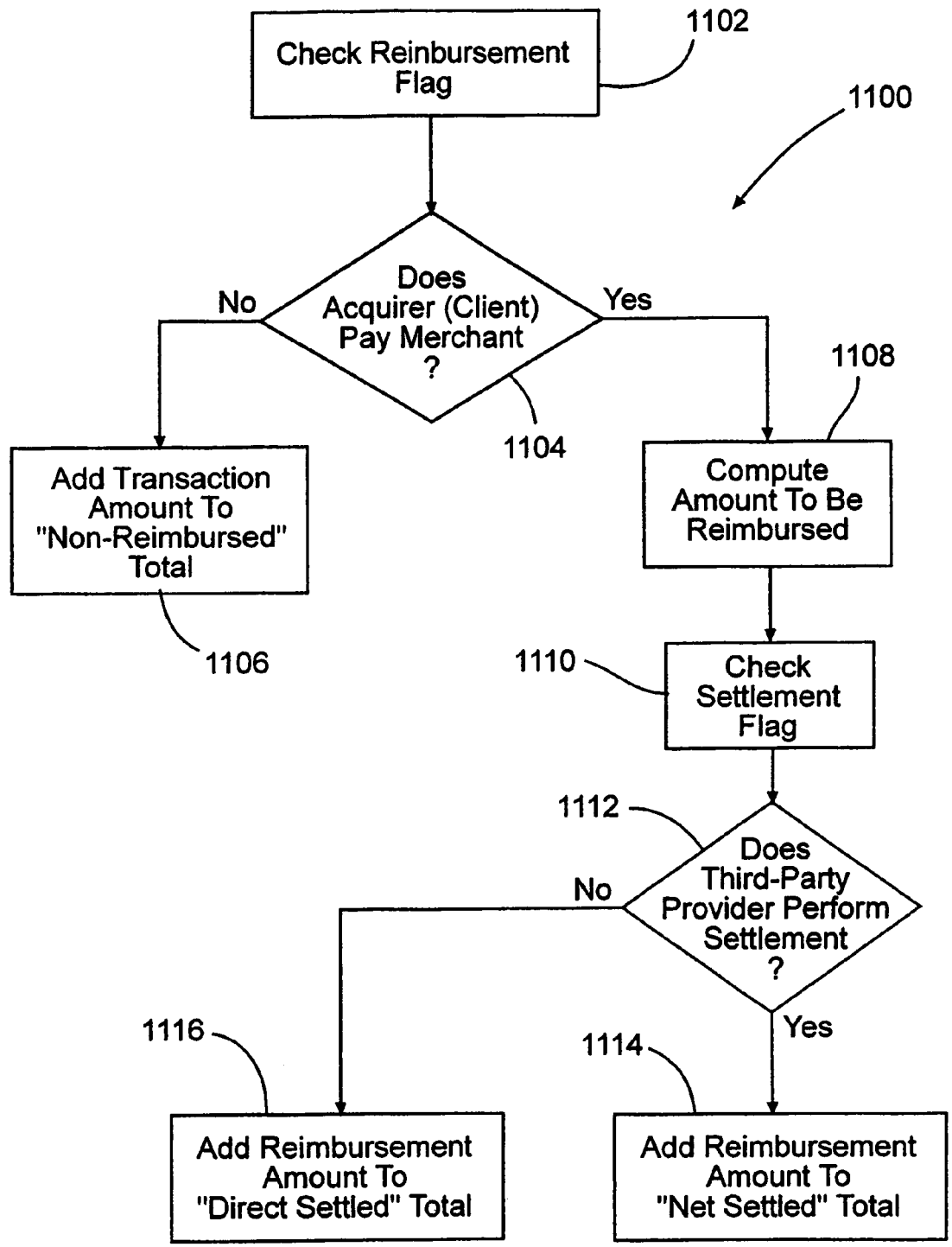
FIG. 11 is a flow chart of accounting processing steps according to an embodiment of the present invention.

At step 1034, accounting operations are performed. In general, these operations include tracking balances owed to the merchant by the acquirer or the card issuer and generating any necessary funds transfer transactions, as well as reporting account activity to the acquirer and/or merchant. In an embodiment of the present invention, transactions for all card types may be handled by a similar accounting process. An example of accounting steps is shown in FIG. 11; these steps may constitute part of step 1034. First, the reimbursement flag 410 in merchant card type list 400 is checked (step 1102) to determine whether the client (i.e., the acquiring bank) pays the merchant for the transaction (step 1104). The reimbursement flag reflects the agreements in place between the merchant and the card issuer or association, including applicable card issuer or association rules. If it is determined at step 1104 that the client does not pay the merchant (as is generally the case for certain card associations, e.g., American Express), then the transaction amount is added to a running total of "non-settled" transaction amounts for the batch (step 1106). Typically, the card issuer reimburses the merchant directly for such transactions; accumulating and reporting the total is a convenience to assist the merchant in its bookkeeping.

If it is determined at step 1104 that the client pays the merchant, then at step 1108, a reimbursement amount is determined. The reimbursement amount may be the full transaction amount, or the acquirer may deduct a percentage (the discount rate) from each transaction. In some embodiments, the discount rate may be made to depend on the card type. This could be done, for instance, by providing a discount rate field in the client-level card product list and/or the merchant card type list. For each ticket, the appropriate discount rate based on the card type would be obtained from the list and applied.

At step 1110, the settlement flag is checked to determine how the funds are to be transferred to reimburse the merchant. In one embodiment, the third-party merchant processing provider may have an agreement with the acquirer to generate electronic funds transfer transactions on behalf of the acquirer for some or all card types. Such agreements are reflected by the settlement flag for each card type in the client-level card product list. (In some embodiments, this flag may be duplicated in merchant card type list 400 for each card type accepted by the merchant.) At step 1112, it is determined from the value of the settlement flag whether the third-party provider has agreed to generate a funds transfer transaction for the card type. If the settlement flag has value "Y," then the reimbursement amount computed in step 1106 is added to a "net settled" total at step 1114. If the settlement flag has value "N," then the reimbursement amount is added to a "direct settled" total at step 1116. Upon completion of the batch, an electronic funds transfer transaction (e.g., an ACH transaction) for the "net settled" total from a designated client account to the merchant account is generated. The "direct settled" total is not automatically transferred; instead, it is reported to the acquirer, who then transfers corresponding funds by any desired method.

It should be noted that for reporting purposes, the net settled, direct settled and non-reimbursed totals may each include a breakdown of each total by card type and/or transaction type. Such breakdowns may be provided to acquirers and/or merchants to aid them in assessing the financial performance of their purchase card operations. In addition, separate electronic funds transfer transactions may be generated for different transaction types and/or card types; it will be appreciated that accumulating amounts for various transactions together and then generating a single electronic funds transfer transaction reduces the number of such transactions that are generated.

Returning to process 1000, after the routing (step 1030) and accounting (step 1034) processes are complete, it is determined at step 1040 whether more tickets remain in the batch. If so, the process returns to step 1004 to extract the next ticket. If not, end-of-batch processing is performed at step 1042. Depending on implementation, this may include generating reports, transmitting transaction data to routing destinations, and generating one or more electronic funds transfer transactions (e.g., for "net settled" amounts).

It will be appreciated that process 1000 is illustrative and may be modified or varied. Steps not described in detail may be implemented using any suitable techniques, a number of which are known in the art. In some implementations, authorization and acquisition may be performed concurrently for some or all card types, in accordance with rules established by various card issuers, associations, and networks. Further, acquisition of tickets need not be performed in batch; individual tickets could be presented by the merchant and processed by platform 100 as customer transactions are completed. Totals could be accumulated on a daily (or other periodic) basis for reporting and/or generating funds transfer transactions. In view of the present disclosure, a person of ordinary skill in the art will recognize other ways and/or methods of implementing transaction processing controlled by parameters associated with card type identifiers.

In some embodiments of the present invention, platform 100 is able to process all card types recognized by a third-party provider of merchant services and all transaction types for each recognized card type. Consequently, there is no need for the third-party provider to maintain multiple records for the same merchant; all of a particular merchant's processing needs may be supported using a single merchant record 300 maintained on a single platform 100. Of course, in the case of a large third-party provider with many clients, it may be desirable to maintain multiple platforms 100, but a record for a particular merchant would only need to be accessible by one such platform.

In some cases, the third-party provider may also provide card-issuer services to an issuer; the option of routing transactions for that issuer's card products directly to another one of the third party provider's platforms may result in increased efficiency for settlement processing. For example, the third party provider can maintain cardholder account records for a private-label card product (e.g., retailer P) on one of its platforms 100 (using cardholder data store 130). Merchant records for retailer P's outlets can be maintained on the same platform 100 or a different platform 100, with appropriate routing destination parameters for card types corresponding to the product.

Accordingly, some embodiments of the present invention offer the possibility of expanded acceptance of private label card products at locations not directly associated with the issuer. For instance, by exploiting the ability to designate a routing destination for any card type, acceptance of retailer P's private label card products could be expanded to merchants other than retailer P's outlets, regardless of whether account records for those merchants are on the same platform 100 as retailer P's cardholder records. Thus, a cardholder who has retailer P's private label card may be able to use that card for "cross-shopping" at other stores. For instance, in FIG. 7, "Client #1" may be an acquiring bank that also issues retailer P's private label cards, and "Client #2" may be a different acquiring bank that also issues retailer H's private label cards. A merchant card type list, such as list 728 for merchant H or list 724 for merchant P, may include both of these cards, meaning that merchants H and P are able to accept each other's cards, as well as their own card and any other card types in their respective lists. Thus, a cardholder who has merchant P's private label card can use it at merchant H's outlets as well as merchant P's, and vice versa.

As long as the card products appear as card types on the master card product list, platform 100 can support acceptance of that card by any merchant using processes such as those described above. Thus, essentially unlimited cross-shopping is made possible without requiring merchant records to be maintained for the same merchant on multiple platforms or under multiple merchant identifiers.

It is to be understood that such cross-shopping arrangements are not required by the present invention; in general, cross shopping between retailer H and retailer P (or any other issuers) would be implemented only if the two retailers desired it and entered into an appropriate agreement. Once that agreement is in place, however, the third party provider (or acquirer) would be able to support the desired arrangement. Those of skill in the art will appreciate that there are various circumstances in which such arrangements would be desirable.

Another feature provided by some embodiments of the present invention is the ability to support a "co-branded" card product. A co-branded card product bears badges of two different entities, such as a card association (e.g., card association A) and a retailer (e.g., retailer D). Under the terms of a co-branding arrangement, the co-branded card products is to be processed as retailer D's private label card when the merchant is one of retailer D's outlets; for all other merchants, the card product is to be processed as an association A card product.

To support such an arrangement, suitable card types may be defined in master card product list 200. For instance, card association A may designate a block of its ISO-assigned prefixes as identifying the co-branded card product. As shown in FIG. 2, the prefixes so designated may be associated with two different card types in master card product list 200: the association-A card type "05001" and the retailer-D card type "09003". Each type has a different routing destination and may have different values for other fields. For merchants that are retailer D's outlets, card type "09003" (retailer D card) is included in merchant card type list 400. Upon receipt of a transaction using the co-branded card product from one of retailer D's outlets, the prefix is mapped to the retailer D card type by the processes described above. Because transaction processing is controlled by parameters associated with the card type determined from the merchant card type list, the transaction is processed as a retailer D private label card transaction. For other merchants, the association A card type "05001" may be included in merchant card type list 400. Upon receipt of a transaction using the co-branded card from such a merchant, the prefix is mapped to the association A card type by the same processes, and the transaction is processed as an association A card transaction. By assigning different card types to different merchants, the co-branded card product can be made to have the desired behavior. More than two brands can be supported if desired. Also, if retailer D desired to accept association A card products other than the co-branded product, a card type that mapped to all of association A's prefixes other than the co-branded prefix(es) can be defined and included in merchant card type list 400 for retailer D's outlets.

It is to be understood that co-branding for any card product is not a requirement of the present invention. In general, co-branding would be implemented only where there was an agreement in place between parties desiring such an arrangement. Once such an agreement is in place, card type controlled processing enables a third-party provider (or acquirer) to support such an arrangement.

Other embodiments of the present invention may support special processing rules imposed on particular merchants. For example, a vendor may make an arrangement with a card-issuing bank to provide "statement stuffers," i.e., special offers made available to that bank's cardholders. In such arrangements, it is generally expected that the vendor will accept only orders placed by the issuing bank's cardholders using the issuing bank's cards (not orders placed using other cards from the same association) and that such transactions will be settled directly with the issuing bank, without going through any card association or interchange. In an embodiment of the present invention, this arrangement can be enforced. For instance, a special card type can be defined to includes only prefixes assigned by the card association to a specific issuing bank and designating the issuing bank as the routing destination. The vendor's merchant card type list can include only this special card type. As a result, only the issuing bank's cards are accepted by the vendor, and the transactions are processed in the desired manner. It will be appreciated that a vendor could conduct statement stuffer operations concurrently with a number of card issuing banks. A special card type could be defined for each such bank, and all such card types could be assigned to the vendor.

Yet other embodiments of the present invention may support additional distinction among card products included in the same card type. As described above, card types are defined by master card product list 200 and provide at least an association between a set of prefixes and a routing destination. In some instances, however, it may be useful to distinguish between card products that are processed in the same way. For instance, it may be desirable to distinguish association A's credit card product from association A's debit card product, even though the acquirer routes all transactions for both card products to association A's interchange. Such distinctions could be useful, e.g., to apply different discount rates if association A charges different interchange fees for credit card and debit card transactions, or for reporting purposes.

In one embodiment of the present invention, such distinctions are supported by providing one or more card product identifiers associated with each card type. For instance, a card product identifier may be a three-character alphanumeric code. Associated with each card product identifier is an appropriate subset of the prefixes associated with the card type. A merchant may elect to accept all card products within a given card type or select individual card products to be accepted. For instance, a merchant may choose to accept credit cards but not debit cards from a particular association. In this case, prefixes corresponding to debit card products are removed from the merchant card type list for that merchant.

It should be noted that card products can also be distinguished by defining each card product as a different card type; however, providing for distinctions of card products within a card type may simplify operations by reducing the number of card types. In addition, a card association that provides multiple card products may require merchants to accept all of the association's card products or none of them. Grouping all card products of an association under a single card type may assist operators of platform 100 in enforcing such a rule.

In some embodiments, card product identifiers could also be used to establish a discount rate dependent on the card product. For instance, suppose that card association A issues both a debit card and a credit card, and charges a higher interchange fee for debit card transactions than for credit card transactions. To reflect the difference in its costs, an acquirer may desire to charge merchants a higher discount rate for debit card transactions. By associating a discount rate with each card product, it would be possible to enable an acquirer to make these distinctions.

In another embodiment, card product identifiers may also be used to group cards issued under different labels together. For instance, a single issuer may issue private label cards for a number of retailers; transactions using all such retailers' cards are routed to the same destination. To facilitate handling, the various retail card products issued by this issuer can be assigned the same card type but different card product identifiers. As long as a merchant can select which cards to accept at the card product level, this would not result in a merchant being required to accept a different retailer's card.

In yet another embodiment of the present invention, for each card type, debit card products and credit card products may be distinguished. This can be done with or without distinguishing every card product. Merchant card type list 400 may include an indicator for each card type to show whether debit card products, credit card products, or both are to be accepted. This is just one example of the ways in which the data included in merchant card type list 400 may be varied.

While the invention has been described with respect to exemplary embodiments, one skilled in the art will recognize that numerous modifications are possible. For instance, in addition to purchase cards (e.g., credit cards and debit cards), other types of non-cash payment instruments (e.g., electronic checks) may be included. Further, any format for card type definitions and associated parameters may be used as long as the card type definition includes information sufficient to control transaction processing. Determining a card type for a transaction may be implemented in various ways using any information obtainable from the presentation instrument.

Card types may be defined to include arbitrary combinations of cards. As noted above, each card product could have a different card type identifier, or cards issued under different labels could be grouped together as a single card type. In some cases a card type may include only some cards corresponding to a particular card product. Information may be stored and accessed at the merchant level or acquirer level as desired.

The processes described herein are not limited to platform 100 and may be implemented using any suitable components, including hardware, software, and any combination thereof. Embodiments of the present invention may also use any conventional processing steps and transaction data formats.

Embodiments of the present invention are suitable for use by an acquiring bank (or any other entity that performs the acquirer functions) or a third-party provider.

Thus, although the invention has been described with respect to exemplary embodiments, it will be appreciated that the invention is intended to cover all modifications and equivalents within the scope of the following claims.

What is claimed is:

1. A computer-implemented method for acquirer processing of a purchase card transaction submitted by a merchant, the method comprising:

storing, in a database, a merchant card type list including a plurality of merchant card type records, each merchant card type record corresponding to one of a plurality of card types accepted by the merchant, each merchant card type record including a merchant-specific group of purchase card identifiers associated with that card type and a plurality of merchant-specific processing parameters defining processing rules for transactions for that card type, wherein a purchase card identifier is included in at most one of the merchant-specific groups of purchase card identifiers;

receiving, at an acquiring server communicably coupled to the database, transaction data for the purchase card transaction, the transaction data including a purchase card identifier of a presented card;

matching, by the acquiring server, the purchase card identifier of the presented card to one of the merchant-specific groups of purchase card identifiers in the merchant card type list in the database, thereby identifying a card type for the presented card;

obtaining from the database, by the acquiring server, the merchant specific processing parameters of the merchant card type record corresponding to the identified card type; and processing and routing the purchase card transaction by the acquiring server in accordance with the processing rules defined by the merchant-specific processing parameters obtained from the database.

2. The method of claim 1, wherein the merchant specific processing parameters obtained during the act of obtaining include a routing parameter identifying a routing destination and wherein processing and routing the purchase card transaction by the acquiring server includes:
routing the transaction data to the routing destination identified by the routing parameter.

3. The method of claim 2, wherein routing the transaction data includes:
adding the transaction data to a batch of transaction data to be transmitted to the routing destination.

4. The method of claim 2, wherein the merchant specific processing parameters obtained during the act of obtaining further include a format parameter identifying a data format and wherein processing and routing the purchase card transaction by the acquiring server further includes:
prior to routing the transaction data, formatting the transaction data in the data format identified by the format parameter.

5. The method of claim 2, wherein the purchase card transaction is an authorization transaction, the method further comprising:
receiving an authorization response from the routing destination; and
transmitting the authorization response to the merchant.

6. The method of claim 1, wherein the merchant-specific processing parameters obtained during the act of obtaining include a transaction type parameter specifying one or more transaction types that are to be accepted by the merchant for the identified card type and wherein processing and routing the purchase card transaction by the acquiring server includes:
identifying a transaction type from the transaction data; and
determining from the transaction type parameter whether the merchant is authorized to accept the identified transaction type for the identified card type, wherein the purchase card transaction is rejected if the merchant is not authorized to accept the identified transaction type.

7. The method of claim 6, wherein the transaction type parameter specifies one or more of sales transactions, cash advance transactions, return transactions, or payment transactions.

8. The method of claim 6, wherein the transaction type parameter specifies one or more of authorization transactions or ticket transactions.

9. The method of claim 1, wherein the merchant-specific processing parameters obtained during the act of obtaining include a reimbursement flag indicating whether the acquirer reimburses the merchant and wherein processing and routing the purchase card transaction by the acquiring server includes:
extracting a transaction amount from the transaction data;
determining from the reimbursement flag whether the acquirer reimburses the merchant for transactions for the identified card type;
in the event that the acquirer does not reimburse the merchant, adding the transaction amount to a first running total; and
in the event that the acquirer reimburses the merchant, performing the following acts:
computing a reimbursement amount from the transaction amount; and
adding the reimbursement amount to a second running total.

10. The method of claim 9, wherein the merchant specific processing parameters obtained during the act of obtaining further include a discount rate parameter and wherein computing the reimbursement amount from the transaction amount includes:
determining a discount rate from the discount rate parameter; and
computing the reimbursement amount by reducing the transaction amount by the discount rate.

11. The method of claim 9, further comprising:
after processing a batch of purchase card transactions submitted by the merchant, initiating, at the acquiring server, a funds transfer transaction from the acquirer to the merchant, wherein the amount transferred by the funds transfer transaction is equal to the second running total.

12. The method of claim 9, further comprising:
after processing a batch of purchase card transactions submitted by the merchant, reporting, by the acquiring server, the first running total and the second running total to the merchant.

13. The method of claim 9, further comprising:
adding the transaction amount to a third running total corresponding to the identified card type.

14. The method of claim 1, wherein the plurality of card types accepted by the merchant includes at least a first card type corresponding to a private label card issued for a retailer, and the merchant is not an outlet of the retailer.

15. The method of claim 1, wherein each merchant-specific group of purchase card identifiers comprises a range of card prefixes.

16. The method of claim 15, wherein matching the purchase card identifier of the presented card includes:
determining a card prefix from the purchase card identifier of the presented card; and
determining whether the card prefix of the presented card is within the range of card prefixes for one of the merchant-specific groups of purchase card identifiers.

17. The method of claim 1, further comprising:
defining, in a card product database, a master card product list including a plurality of master card type records, each master card type record corresponding to one of a plurality of card types processed by the acquirer,
each master card type record including a master group of purchase card identifiers associated with that card type and a plurality of default processing parameters defining default processing rules for transactions for that card type,
wherein at least one purchase card identifier is included in more than one of the master groups of purchase card identifiers; and
building, by a computer, the merchant card type list,
wherein the act of building includes inheriting, as one or more of the merchant card type records, one or more of the master card type records from the master card product list.

18. The method of claim 17, further comprising, in the computer:
overriding, in the merchant card type list, one of the default processing parameters inherited from one of the master card type records with a merchant-specific value.

19. An acquirer computer system for processing a purchase card transaction submitted by a merchant, the system comprising:

a database configured to store a merchant card type list for the merchant, the merchant card type list including a plurality of card type records, each card type record corresponding to one of a plurality of card types accepted by the merchant, each card type record including a merchant-specific group of purchase card identifiers associated with that card type and a plurality of merchant-specific processing parameters defining processing rules for transactions for that card type, wherein a purchase card identifier is included in at most one of the merchant-specific groups of purchase card identifiers;

an interface configured to receive transaction data for the purchase card transaction, the transaction data including a purchase card identifier of a presented card; and control logic communicably coupled to the database and the interface, wherein the control logic is configured to match the purchase card identifier of the presented card to one of the merchant-specific groups of purchase card identifiers, thereby identifying a card type for the presented card, to obtain from the database the merchant-specific processing parameters of the card type record corresponding to the identified card type, and to process and route the purchase card transaction in accordance with the processing rules defined by the obtained merchant-specific processing parameters.

20. The system of claim 19, wherein the obtained merchant-specific processing parameters include a routing parameter identifying a routing destination and a format parameter identifying a data format, the system further comprising:

control logic configured to format the transaction data in the data format identified by the format parameter and to route the formatted transaction data to the routing destination identified by the routing parameter.

21. The system of claim 20, wherein the control logic is further configured to:

receive an authorization response when the purchase card transaction is an authorization transaction; and transmit the authorization response to the merchant.

22. The system of claim 19, wherein the plurality of card types accepted by the merchant includes at least a first card type corresponding to a private label card issued for a retailer, and the merchant is not an outlet of the retailer.

23. The system of claim 19, wherein each merchant-specific group of purchase card identifiers comprises a range of card prefixes and wherein the control logic is further configured to match a card prefix of the presented card to one of the ranges of card prefixes.

24. A computer-implemented method for acquirer processing of a purchase card transaction submitted by a merchant, the method comprising:

storing, in a database, a merchant card type list including an identifier of each of one or more card types accepted by the merchant and a plurality of merchant-specific processing parameters associated with each accepted card type, wherein the merchant card type list includes at least a first card type corresponding to a private label card issued for a retailer and wherein the merchant is not an outlet of the retailer;

receiving, at an acquiring server communicably coupled to the database, transaction data for the purchase card transaction, the transaction data including a purchase card identifier;

matching, by the acquiring server, the purchase card identifier to one of the card types in the merchant card type list in the database, thereby identifying a card type for the purchase card;

obtaining from the database, by the acquiring server, the merchant specific processing parameters associated with the identified card type; and processing and routing the purchase card transaction by the acquiring server in accordance with the merchant-specific processing parameters obtained from the database.

25. An acquirer computer system for processing a purchase card transaction submitted by a merchant, the system comprising:

a database configured to store a merchant card type list for the merchant, the merchant card type list including an identifier of each card type accepted by the merchant and a plurality of merchant-specific processing parameters associated with the card type, wherein the merchant card type list includes at least a first card type corresponding to a private label card issued for a retailer and wherein the merchant is not an outlet of the retailer;

an interface configured to receive transaction data for the purchase card transaction, the transaction data including a purchase card identifier; and control logic communicably coupled to the database and the interface, wherein the control logic is configured to match the purchase card identifier to one of the card types in the merchant card type list, to obtain from the database the merchant-specific processing parameters associated with the identified card type, and to process and route the purchase card transaction in accordance with the obtained merchant-specific processing parameters.

* * * * *